US009496621B2

(12) United States Patent
Meschini et al.

(10) Patent No.: US 9,496,621 B2
(45) Date of Patent: Nov. 15, 2016

(54) LARGE DEPLOYABLE REFLECTOR FOR A SATELLITE ANTENNA

(71) Applicant: Thales Alenia Space Italia S.p.A. Con Unico Socio, Rome (IT)

(72) Inventors: Alberto Meschini, Rome (ID); Riccardo Rigato, Rome (IT); Davide Scarozza, Rome (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 3 days.

(21) Appl. No.: 14/440,515

(22) PCT Filed: Nov. 4, 2013

(86) PCT No.: PCT/IB2013/059894
§ 371 (c)(1),
(2) Date: May 4, 2015

(87) PCT Pub. No.: WO2014/068538
PCT Pub. Date: May 8, 2014

(65) Prior Publication Data
US 2015/0303582 A1    Oct. 22, 2015

(30) Foreign Application Priority Data

Nov. 5, 2012  (EP) .................................... 12425177
Mar. 13, 2013  (EP) .................................... 13159073

(51) Int. Cl.
*H01Q 15/16*    (2006.01)
*B64G 1/22*    (2006.01)
(Continued)

(52) U.S. Cl.
CPC ............ *H01Q 15/161* (2013.01); *B64G 1/222* (2013.01); *B64G 1/66* (2013.01); *H01Q 1/288* (2013.01)

(58) Field of Classification Search
CPC ............................ H01Q 15/161; H01Q 1/288

USPC ..... 343/757, 761, 779, 781 P, 840, 912, 915
See application file for complete search history.

(56) References Cited

U.S. PATENT DOCUMENTS 3,913,105 A   10/1975  Williamson et al.
4,115,782 A *  9/1978  Han ........................ H01Q 1/288
                                                                    343/779

(Continued)

FOREIGN PATENT DOCUMENTS

CN   102173312   9/2011
EP   0959524    11/1999

OTHER PUBLICATIONS

PCT International Patent Search Report and Written Opinion dated Apr. 11, 2014 for PCT International Patent Application No. PCT/IB2013/059894.

*Primary Examiner* — Tho G Phan
(74) *Attorney, Agent, or Firm* — McCarter & English, LLP

(57) ABSTRACT

A large deployable reflector for an antenna suitable for being installed on board a satellite and provided with a support structure, a parabolic mirror carried by the support structure and a connection arm for mounting the support structure on the satellite; the support structure being a jointed reticulate structure that is able to assume a compact inoperative stowed configuration and an operative deployed configuration and is composed of 'n' elements articulated to form tetrahedrons having respective triangular bases, which are connected to each other at the axial ends of respective first sides and have respective external vertices, which are opposite to said respective first sides and, when the reflector is arranged in the deployed configuration, ideally lie on a cone tangent to the parabolic mirror.

12 Claims, 21 Drawing Sheets

(51) Int. Cl.
   *H01Q 1/28*   (2006.01)
   *B64G 1/66*   (2006.01)

(56) References Cited

U.S. PATENT DOCUMENTS

| | | | | |
|---|---|---|---|---|
| 5,228,258 A | * | 7/1993 | Onoda | B64G 9/00 343/915 |
| 5,757,335 A | * | 5/1998 | Kaneff | F24J 2/10 343/840 |
| 6,542,132 B2 | * | 4/2003 | Stern | H01Q 15/161 343/880 |
| 6,975,282 B2 | * | 12/2005 | Kaufman | H01Q 1/1207 343/912 |
| 8,922,456 B2 | * | 12/2014 | Tabata | H01Q 15/161 343/878 |
| 2002/0063660 A1 | | 5/2002 | Harless | |

* cited by examiner

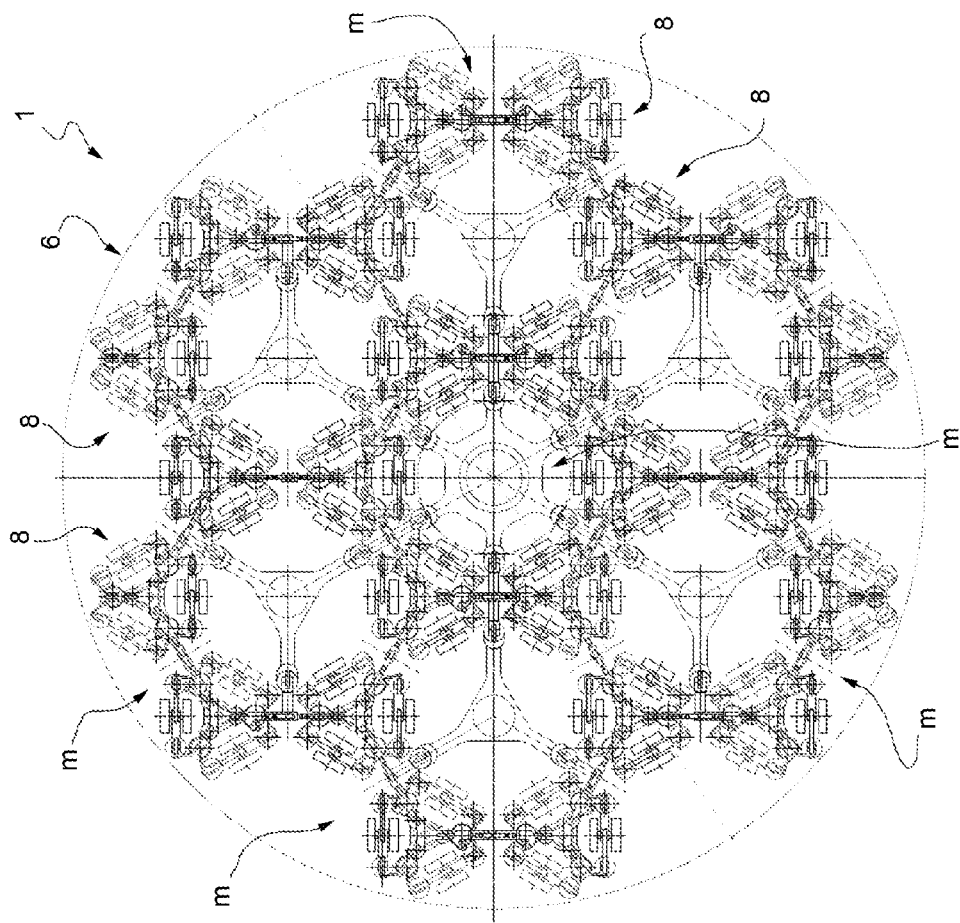
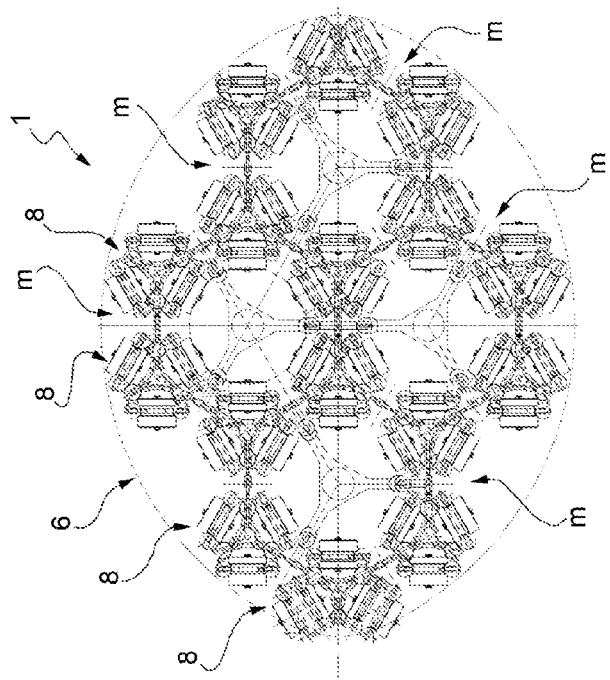

LARGE DEPLOYABLE REFLECTOR FOR A SATELLITE ANTENNA

TECHNICAL FIELD

The present invention relates to a large deployable reflector for a satellite antenna.

STATE OF THE PRIOR ART

As is known, satellite telecommunications systems use satellites placed in geostationary orbit and equipped with a device capable of receiving, amplifying and transmitting radio signals by means of one or more parabolic antennas.

A relatively recently developed type of satellite antenna is composed of large deployable antennas, namely parabolic antennas having a reflector that is equipped with an articulated support structure able to assume a compact stowed configuration during the launch of the satellite and to automatically open in space when the satellite has reached the established orbital position, for assuming a rigid deployed configuration.

A reflector of this type normally has a diameter of between 5 and 16 meters and has a reflective part that is obviously not rigid, but composed of some kind of light, electrically conductive fabric so that it can be folded together with the support structure when the latter is in the above-mentioned stowed configuration, and becomes taut in space when the support structure assumes the deployed configuration in orbit.

A large deployable reflector further comprises a plurality of other components, including at least one mechanical member connecting the support structure to the satellite, means for holding the support structure in the stowed configuration during launching, support structure deployment mechanisms and a plurality of hardware devices for controlling the trim of the reflector.

In general, the construction of a reflector of the above-described type is extremely complex, especially when taking into account the strict requirements that the reflector must respect both regarding weight and bulk, which, in the stowed configuration, must remain within certain payload limits of the satellite launcher, and regarding, more in general, the mechanical properties in terms of strength and reliability that the reflector, and the support structure in particular, must have in order to ensure that the movements in the opening phase in orbit are correctly made and that the final deployed configuration of the reflector accurately corresponds to the envisaged design configuration.

Various solutions for large deployable reflectors have been proposed up to now; however, for the above-described reasons, the majority of these have not proved satisfactory in practice.

SUMMARY OF THE INVENTION

The object of the present invention is to provide an improved type of large deployable reflector for a satellite antenna.

According to the present invention, a large deployable reflector for a satellite antenna is provided as claimed in the appended claims.

BRIEF DESCRIPTION OF DRAWINGS

The invention shall now be described with reference to the attached drawings, which illustrate a non-limitative embodiment, where:

FIG. 16c shows, in lateral elevation and on an enlarged scale, a detail of FIG. 16a;

FIGS. 18a and 18b show, in plan and with parts removed for clarity, respective variants of the reflector in FIG. 1;

PREFERRED EMBODIMENT OF THE INVENTION

Figure 1:
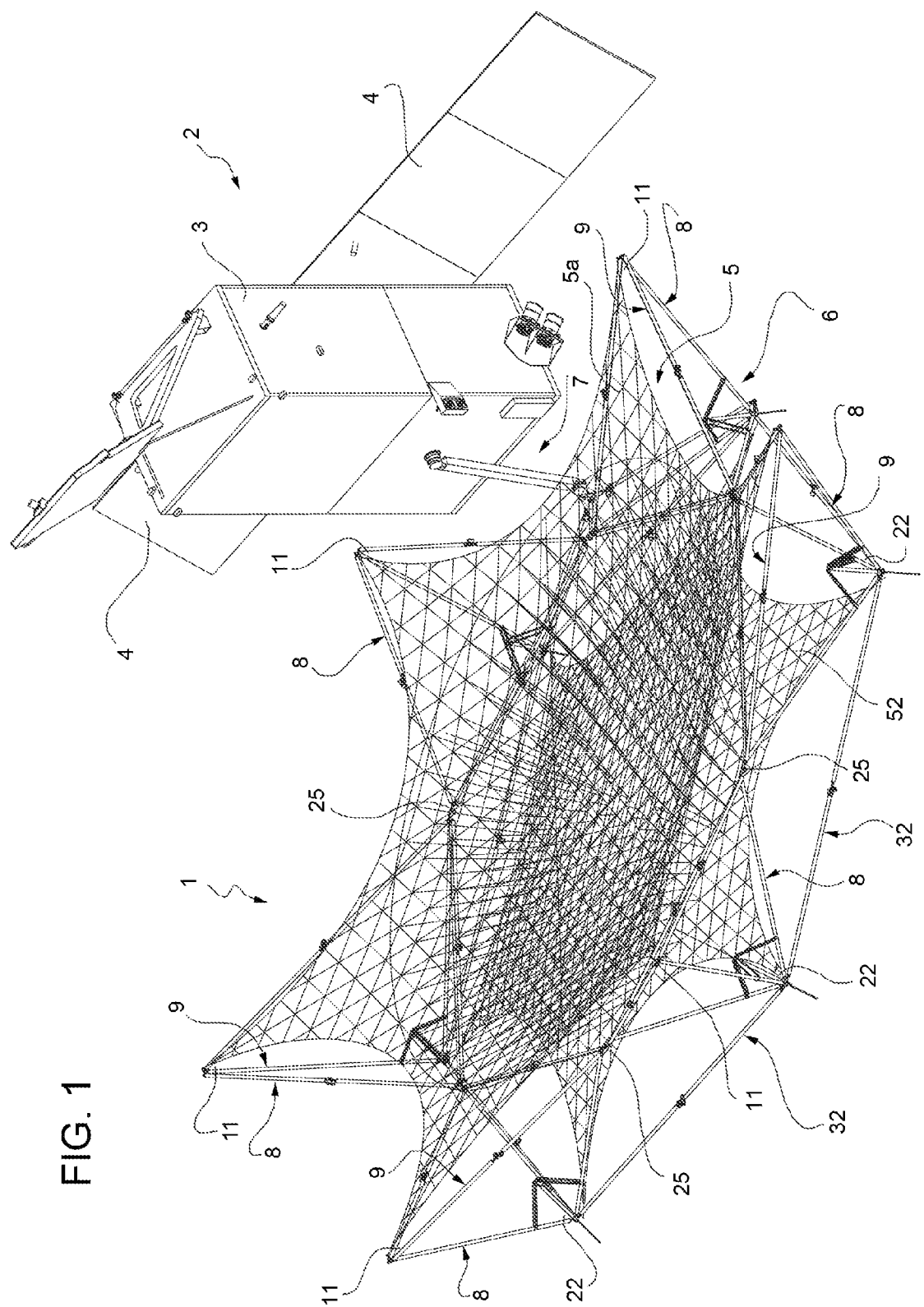
FIG. 1 shows a perspective view, with parts removed for clarity, of a preferred embodiment of the reflector according to the present invention installed on a satellite.

With reference to FIG. 1, reference numeral 1 indicates, as a whole, a reflector of an antenna installed on a satellite 2 (of known type) for telecommunications, navigation, radio science and/or earth observation. Satellites of this type are normally placed in geostationary orbit and comprise a central module 3, which functions as a transportation vehicle for the antenna and comprises, in a known manner, a plurality of components, including, for example, propulsion and drive devices, thermal control devices, trim and orbit control devices, data processing devices and power supply devices able to transform solar radiation into electrical energy by means of a solar panel system 4.

The reflector 1 is of the deployable type, or rather is able to assume a compact stowed configuration during the launch phase of the satellite 2 and to autonomously open in space when the satellite 2 has reached a predetermined orbit for assuming a deployed configuration with sufficient rigidity to enable it to be oriented with precision in the required aiming direction.

Schematically, the reflector 1 can be subdivided into three main components (described further on): a reflector assembly 5, which comprises a reflective parabolic mirror 5a for the reception and transmission of electromagnetic signals, a support structure 6 for the reflector assembly 5 and a connecting device 7 for connecting the reflector 1 to the central module 3.

Figure 2:
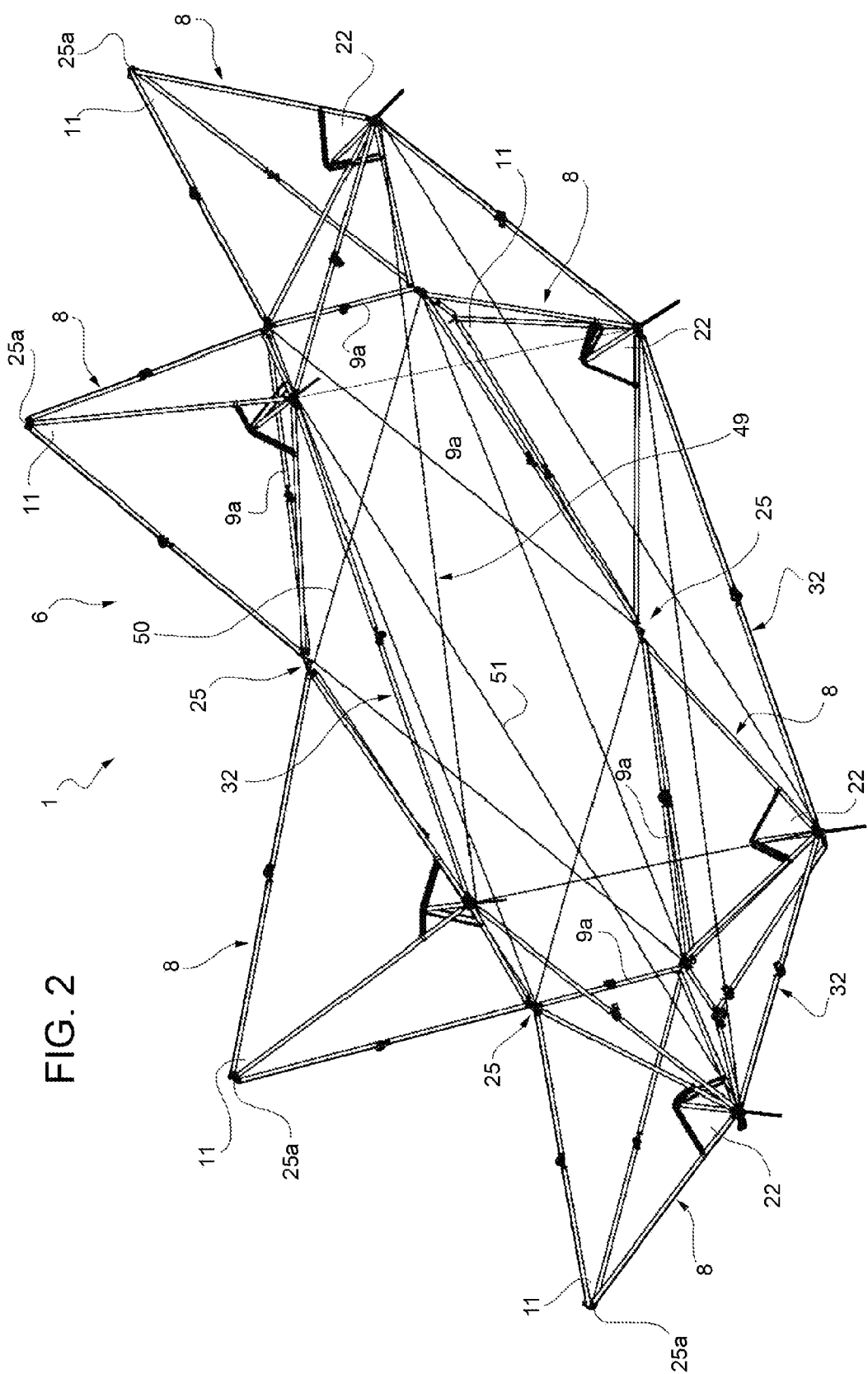
FIG. 2 shows a perspective view, with parts removed for clarity, of a detail of the reflector in FIG. 1.

As can be better seen in FIG. 2, the support structure 6 is a jointed reticulate structure composed of 'n' building blocks, where 'n' is an integer number greater than or equal to three, preferably 6, 7 or 8, each of which is an articulated element movable between a closed or stowed configuration and an open or deployed configuration. In the deployed configuration of the support structure 6, the mentioned articulated elements take the form of tetrahedrons 8, i.e. pyramids having an equilateral or isosceles triangle as the base 9 and connected to each other for forming a ring-like structure to which the reflector assembly 5 is connected.

Figure 3:
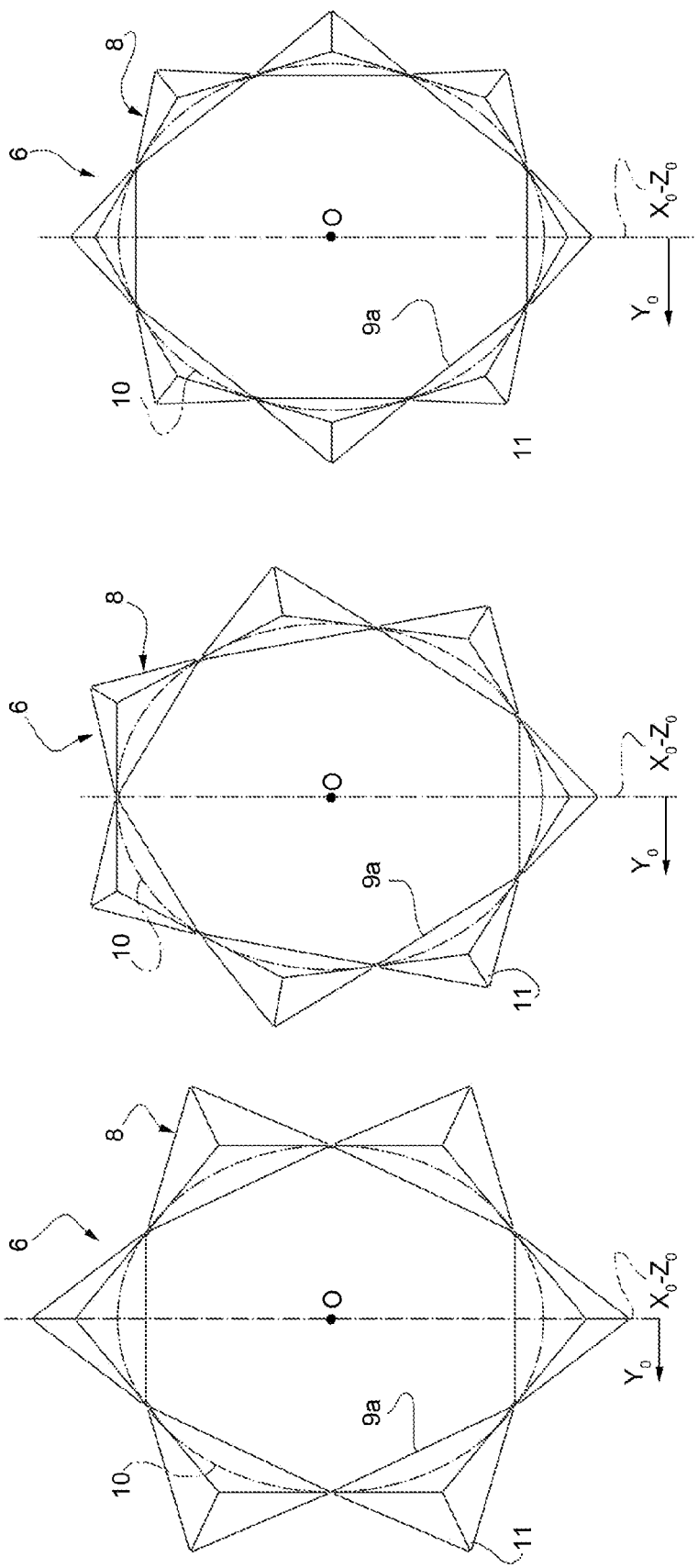
FIG. 3 shows a face view of the detail in FIG. 2 according to three different embodiments.

The geometric arrangement of the tetrahedrons 8 is clearly visible in FIG. 3, which shows, by way of example, the planar extension of the support structure 6 in three different configurations: hexagonal, i.e. composed of six tetrahedrons 8, heptagonal, i.e. composed of seven tetrahedrons 8, and octagonal, i.e. composed of eight tetrahedrons 8. Independently of the number of tetrahedrons that form the support structure 6, it is possible to note that the triangular bases 9 are connected to each other for giving the support structure 6 a star-like shape and delimit, between them, a polygon inscribed in an ellipse 10, the dimensions of which constitute one of the design parameters for the geometry of the support structure 6 and which corresponds to the aperture plane of the parabolic mirror 5a. The tetrahedrons 8 are arranged around the ellipse 10 in a symmetric manner with respect to an optical plane Xo-Zo, which is a plane passing through the major axis of the ellipse 10 and perpendicular to the plane on which the ellipse 10 lies; in other words, each tetrahedron 8 is equal, or rather has the same dimensions and the same base/height ratio, as the tetrahedron 8 that is symmetrical to it with respect to the optical plane Xo-Zo.

As shown in FIGS. 2 and 3, each triangular base 9 comprises an internal side 9a facing a centre O of the ellipse 10 and an external vertex 11 opposite to the internal side 9a. The bases are connected to each other at the axial ends of the respective internal sides 9a and, in the deployed configuration, do not all lie on the same plane, but are rotated in such a way that the respective external vertices 11 ideally lie on a cone C tangent to the parabolic mirror 5a (FIG. 1a). In the case where the base 9 is an equilateral triangle, side 9a is obviously any one of the three sides of the base 9, while in the case where the base 9 is an isosceles triangle, side 9a is the side with a different length from the other two.

Figure 4:
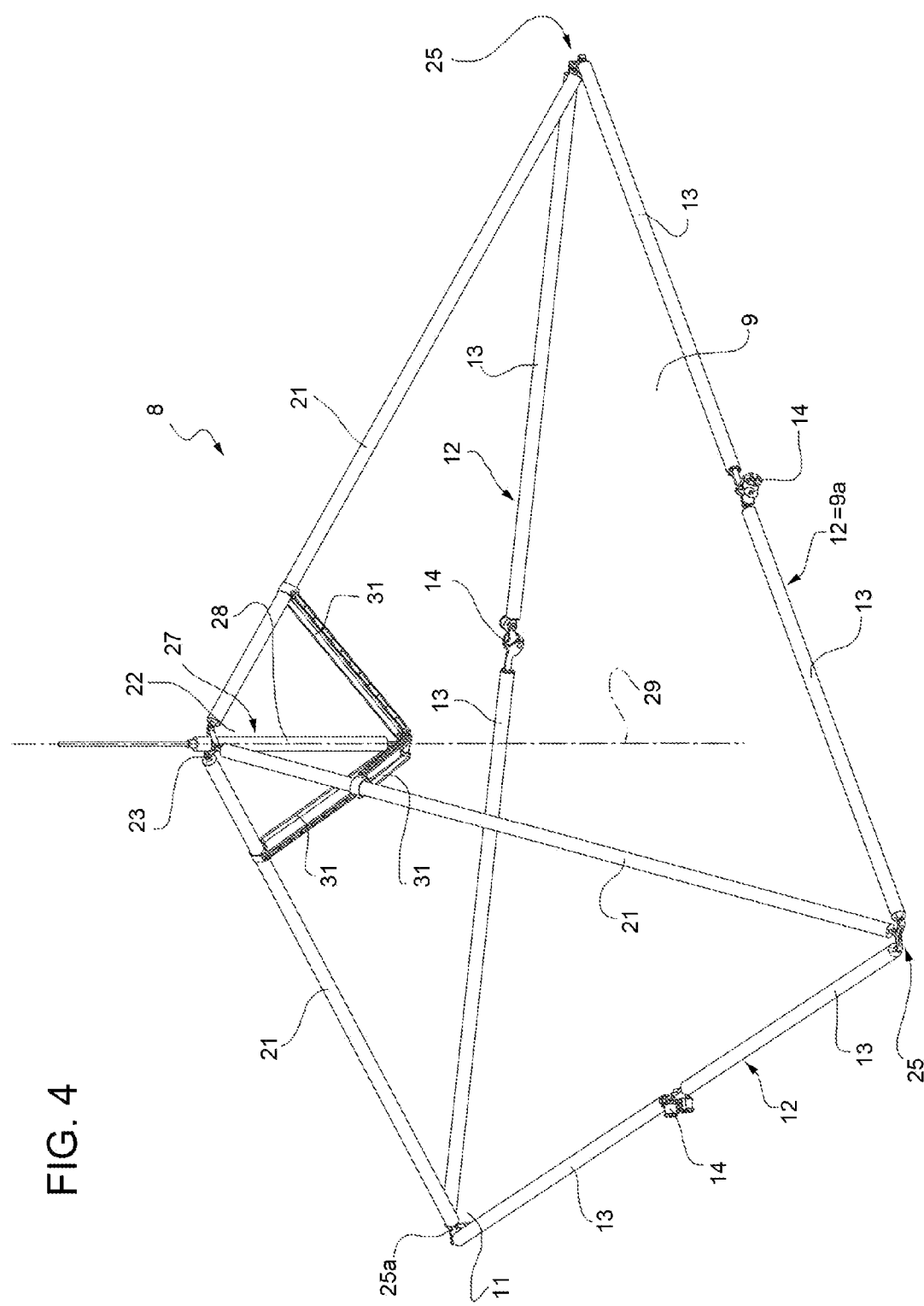
FIG. 4 shows, on an enlarged scale, a detail of FIG. 2.

As shown in FIG. 4, which shows in detail the structure of each tetrahedron 8 arranged in the open or deployed configuration, each base 9 is composed of three bars 12, each of which comprises, in turn, two elements 13 lying on a same plane and connected to each other by a constant-torque flat spring hinge 14, which, together with the respective pair of elements 13, form a one-degree-of-freedom compass, and is configured to operate, as will be seen further on, during deployment of the reflector 1 to rotate the two elements 13 around a hinge axis 15 perpendicular to the plane on which the elements 13 lie and, in this way, cause the controlled deployment of the respective tetrahedron 8.

Figure 5:
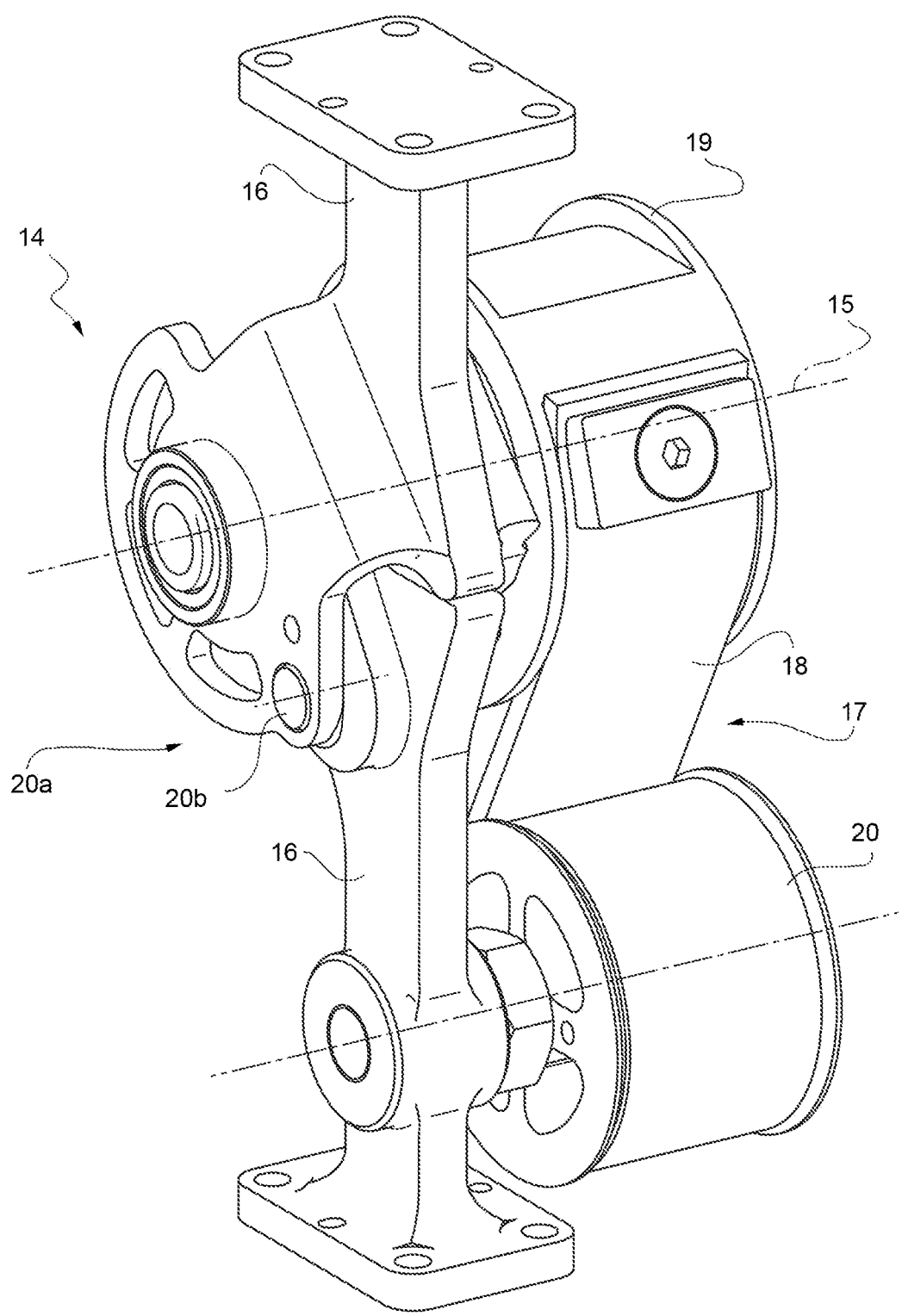
FIG. 5 shows a perspective view of a detail of FIG. 4.

FIG. 5 shows an example of a flat spring hinge 14 arranged in an unwound configuration, corresponding to the open configuration of the tetrahedron 8. Each hinge 14 comprises two brackets 16, which are hinged to each other around axis 15 and are each rigidly connected to a respective axial end of a respective element 13. The hinge 14 further comprises a constant-torque flat spring 17 (of known type) comprising, in turn, a steel band 18, of which a first end is fastened to a spool 19 rigidly mounted on one of the two brackets 16 in a position coaxial with axis 15, and a second end fastened to a winder reel 20 integral with the other bracket 16 and coaxial with an axis parallel to axis 15. Finally, the hinge 14 is fitted with an angular locking device 20a with the function of preventing the two brackets 16 from turning with respect to each other around axis 15 after the tetrahedron 8 has reached the open configuration. In particular, the angular locking device comprises a pin 20b, having its axis parallel to axis and installed, with the interposition of a spring, on a peripheral portion of a plate integral with one of the two brackets 16 and coaxial with axis 15, so that it projects from the plate towards the other bracket 16. When the two brackets 16 rotate with respect to each other, the pin 20b is made to rotate around axis 15 until it is aligned with a hole made on a portion of the other bracket 16 and snap-engages therein.

Referring to FIG. 4, each tetrahedron 8 further comprises three ribs 21, each of which defines, with a respective bar 12, a triangular face of the tetrahedron 8 and, together with the other two ribs 21, forms a vertex 22 opposite to the base 9. The ribs 21 are connected to each other at the vertex 22 by a central hub hinge 23, which enables each rib 21 to oscillate, in use, around a respective axis 24 perpendicular to a respective plane passing through the rib 21 and perpendicular to the base 9.

At the other end to that connected to the central hub hinge 23, each rib 21 converges, together with a respective pair of bars 12, to a respective corner of the base 9; in particular two of the ribs 21 extend from the vertex 22 to respective axial ends of the bar 12 defining the internal side 9a and are connected to each other by a respective triple joint 25 (the structure of which will be dealt with in detail further on), which enables each rib 21 to rotate around a respective axis 26 parallel to respective axis 24 during the deployment of the tetrahedron 8. The other rib 21 extends from vertex 22 to the external vertex 11 and is connected to the relevant pair of bars 12 by a joint 25a able to allow the two bars 12 and the rib 21 to rotate around respective axes, each of which is parallel to the corresponding axis of rotation of the respective bar or rib in the central hub hinge 23.

Figure 6A:
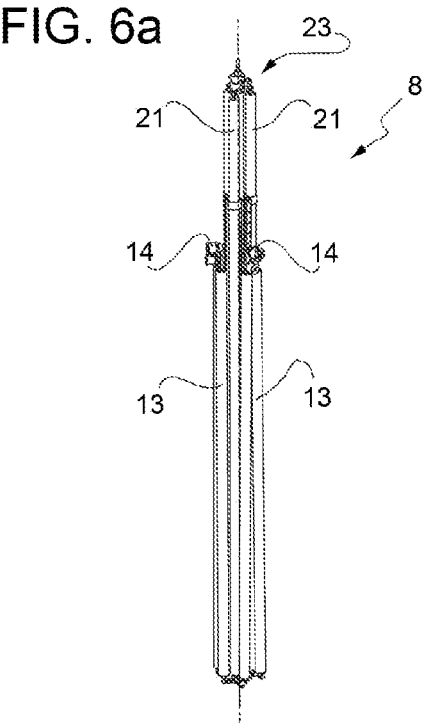
FIGS. 6a, 6b and 6c show the tetrahedron in FIG. 4 arranged in respective different functional configurations.
Figure 6B:
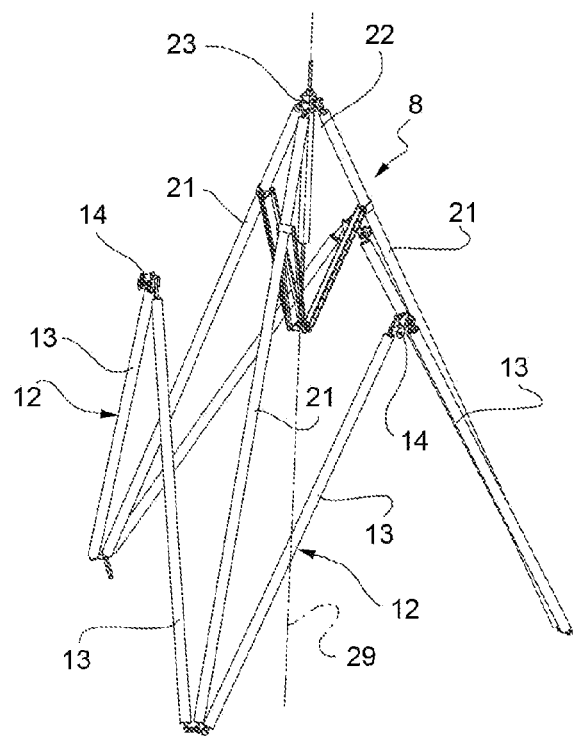
Figure 6C:
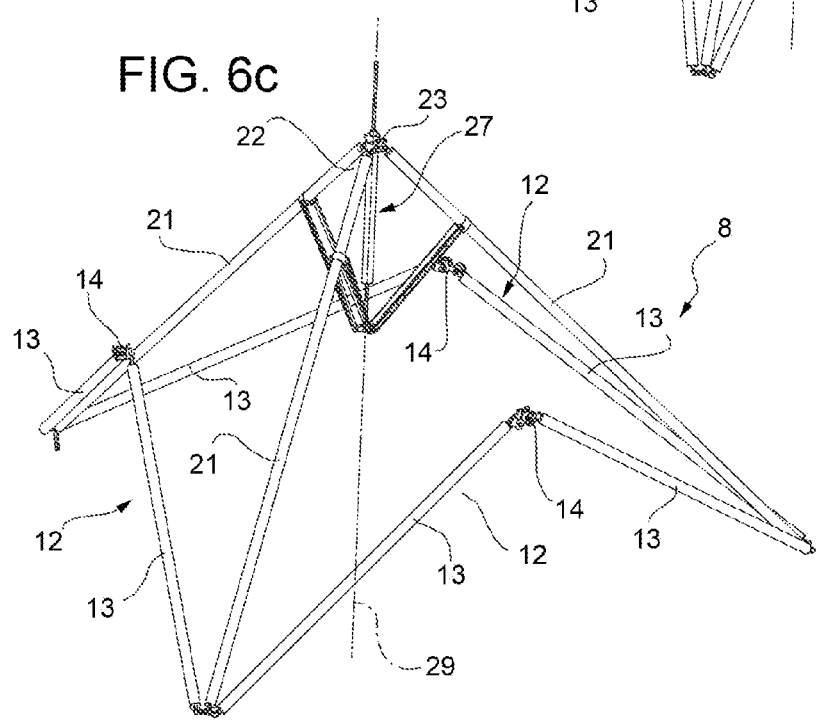

As shown in FIG. 6, each tetrahedron 8 is structured to assume the open or deployed configuration in FIG. 4 at the end of an opening phase performed starting from a stowed configuration (FIG. 6a), in which the elements 13 of the bars 12 and the ribs 21 are parallel to each other and gathered together to form a compact cylindrical bundle. The bars 12 and the ribs 21 are held in the stowed configuration by means of external constraints, which will be discussed further on. The moment that these external constraints no longer exist, each tetrahedron 8 is free to deploy itself under the thrust of the respective flat springs 17, which cause the elements 13 of each bar 12 to rotate around the respective axes 15 so as open like a compass until they are axially aligned with each other. During the expansion of the tetrahedron 8 (FIGS. 6b and 6c), the opening cone of the angle at the vertex 22 progressively widens and the ribs 21 expand, rotating around respective axes 24 and 26. The speed of this umbrella-like opening movement of the tetrahedron 8 is controlled by a damper 27 mounted on the central hub hinge 23.

Figure 7:
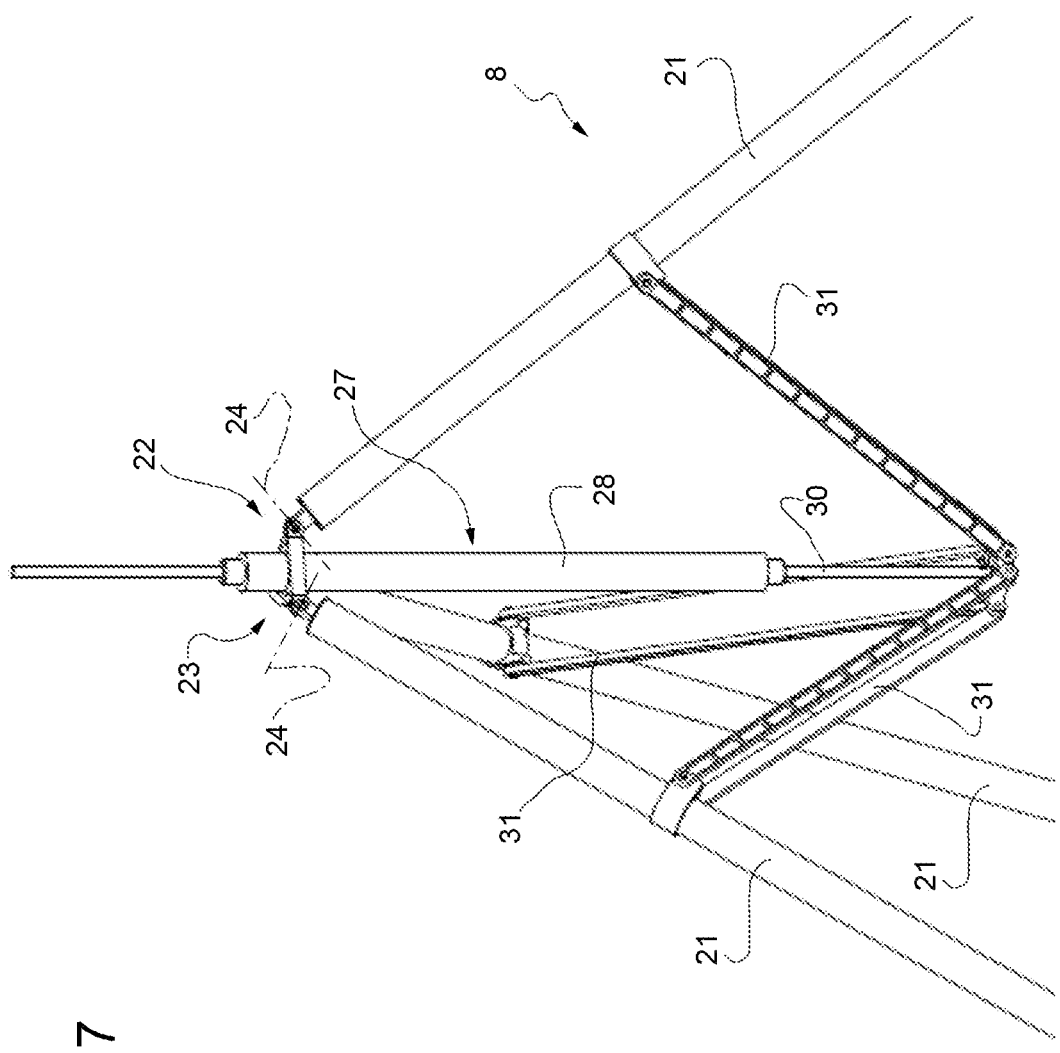
FIG. 7 shows, on an enlarged scale and with parts removed for clarity, a detail of FIG. 6b.

As shown in FIG. 4, and with greater detail provided in FIG. 7, the damper 27 is preferably a linear hydraulic damper comprising a cylinder 28, which extends through the central hub hinge 23 and along a reference axis 29 of the tetrahedron 8, and a rod 30, slidingly mounted inside the cylinder 28 and projecting from the lower end of the cylinder 28 and facing towards the base 9. The damper 27 is connected to the three ribs 21 by three radially-arranged levers 31, each of which is hinged at one end to a respective rib 21 and at the opposite end to the lower end of the rod 30 so as be able to assume, in use, any inclination and aid the opening movement of the ribs 21, at the same time maintaining the correct kinematic constraints between the components of the tetrahedron 8.

With reference to FIG. 2, the vertices 22 of the tetrahedrons 8 are connected to each other by articulated crown of linkages 32 able to follow the opening of the tetrahedrons 8 and, when their opening is complete, guide the rotation of the tetrahedrons 8 around the internal sides 9a of the respective bases 9 to bring the support structure 6 into the final deployed configuration.

Figure 8A:
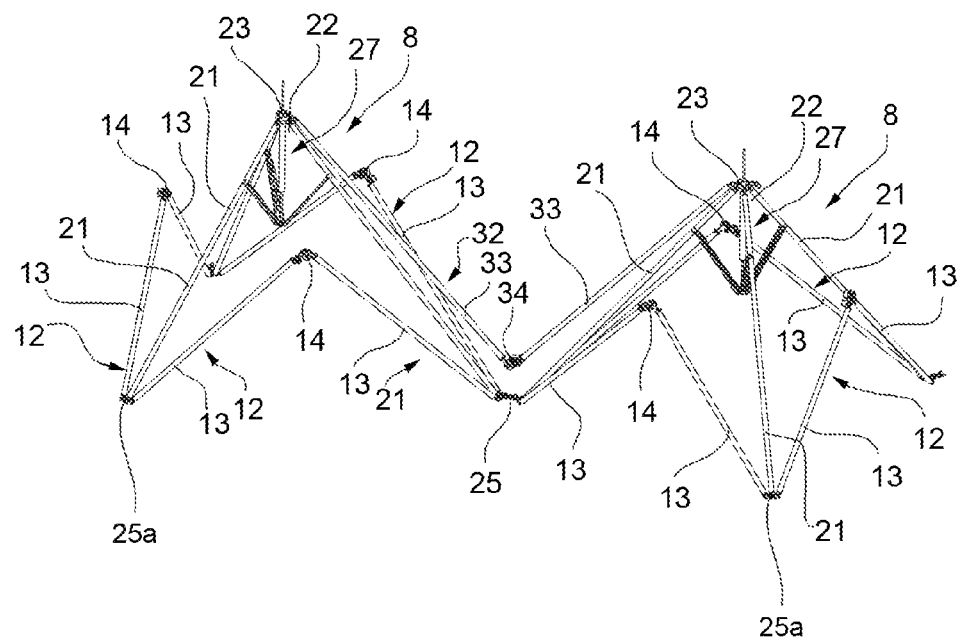
FIGS. 8a and 8b show perspective views of a detail of FIG. 2 in respective functional configurations.
Figure 8B:
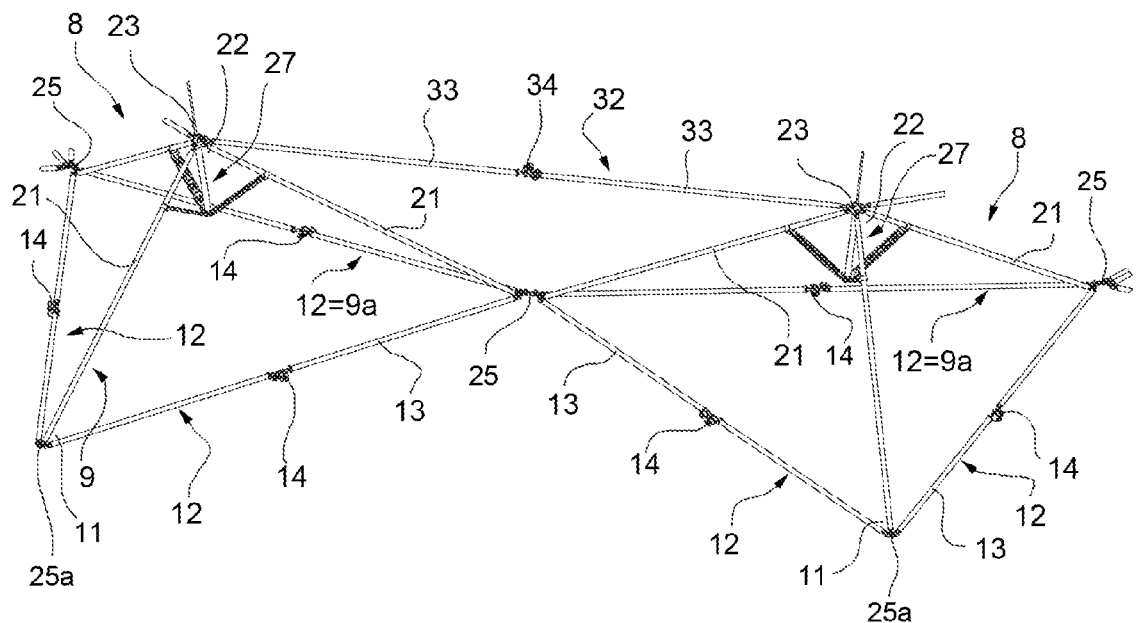
Figure 10:
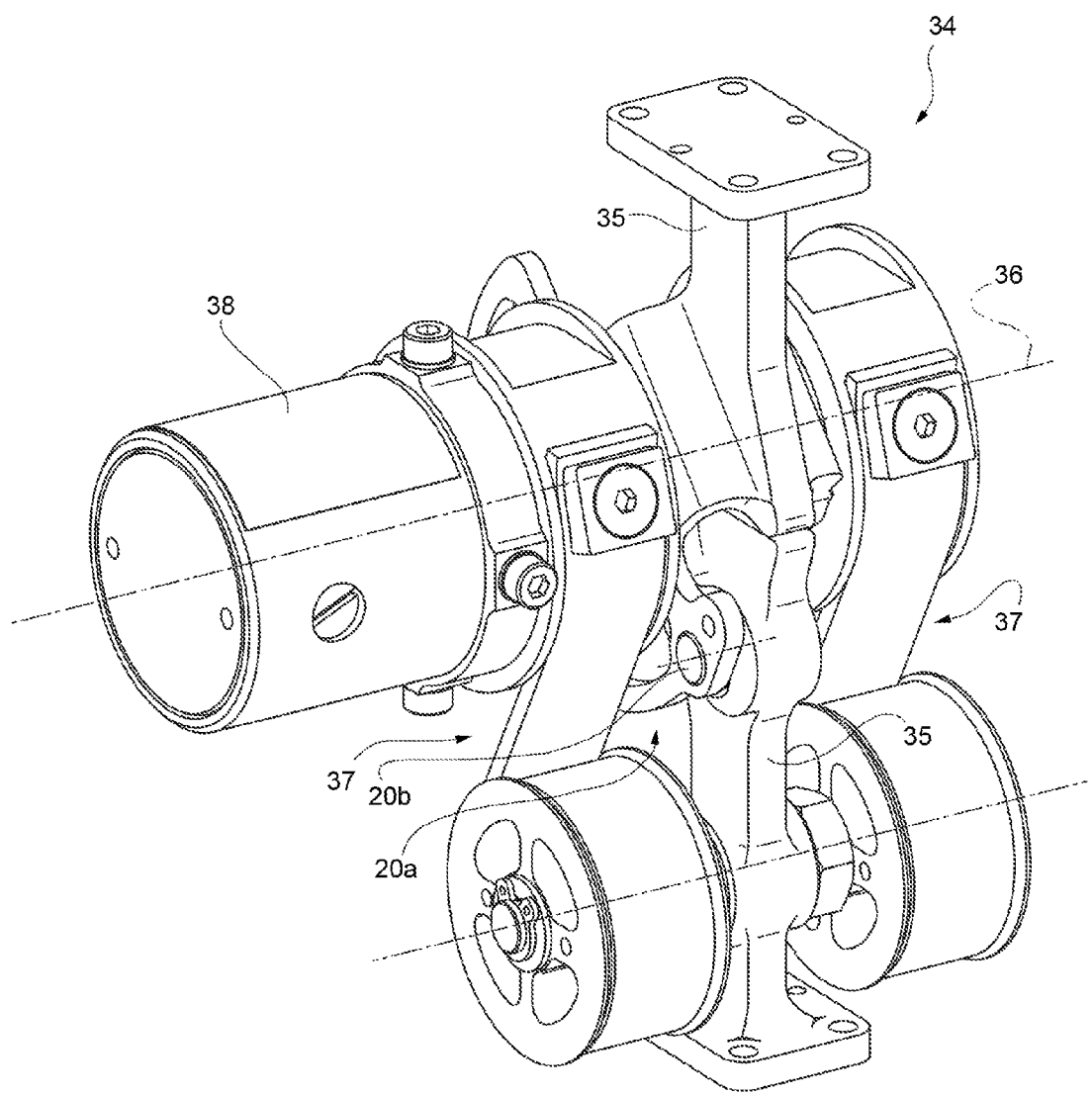
FIG. 10 shows, on an enlarged scale, a further detail of FIG. 8b.

In particular, with reference to FIGS. 8a, 8b and 10, each crowning linkage 32 comprises two portions 33 of equal length lying on a same plane and connected to each other in a jointed manner by a constant-torque damper hinge 34, an example of which is shown in FIG. 10. In particular, the hinge 34 is a flat-spring hinge comprising two brackets 35 rigidly connected to respective axial ends of portions 33 and hinged to each other to rotate around an axis 36 perpendicular to the plane on which the portions 33 lie. The hinge 34 further comprises two constant-torque flat springs 37 (of known type and similar to that of hinge 14), a rotational damper 38 carried on one of the brackets 35 in a position coaxial with axis 36, and a locking device 20a functionally the same as that of hinge 14.

Figure 9:
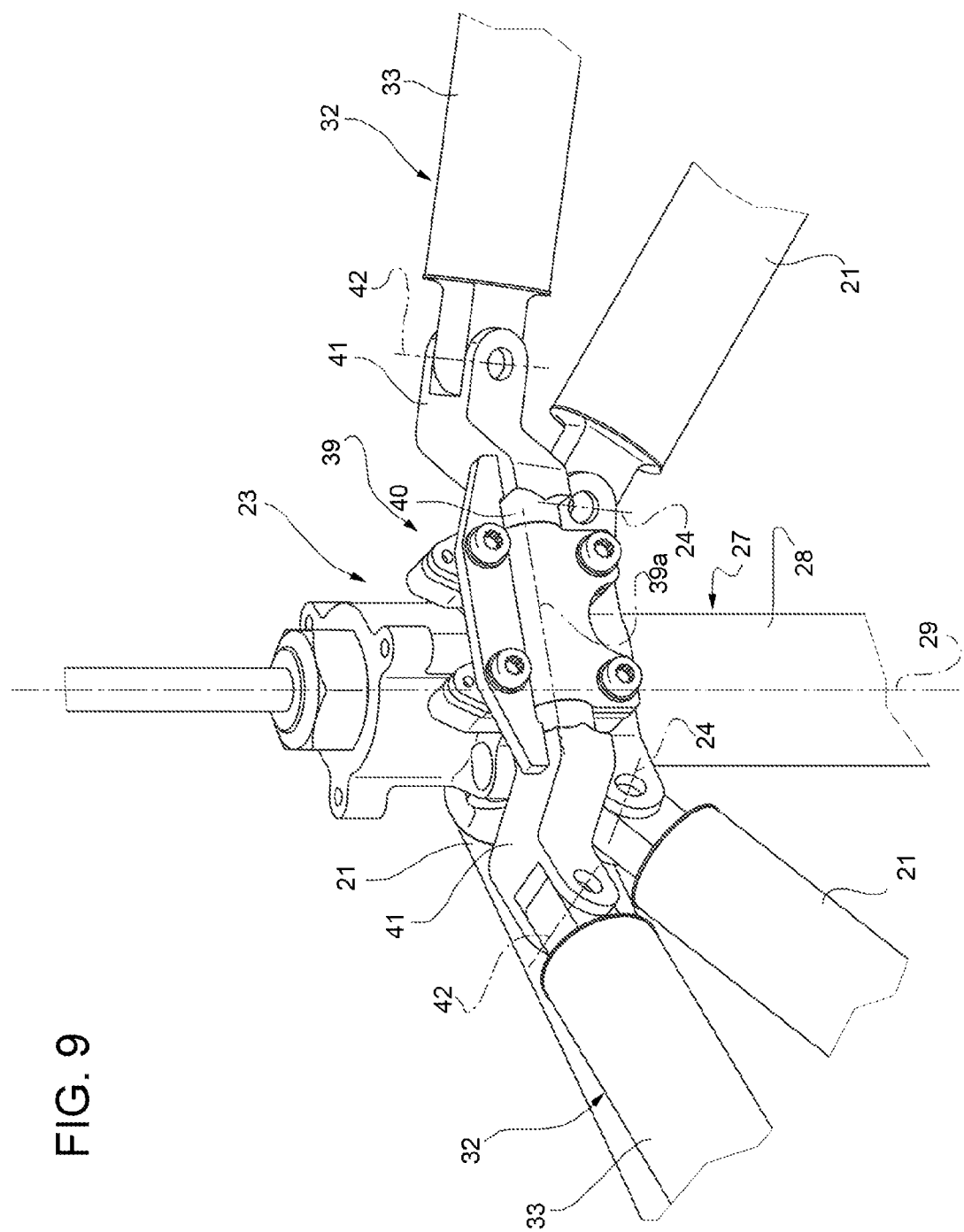
FIG. 9 shows, on an enlarged scale, a detail of FIG. 8b.

As shown in FIGS. 8a and 8b and in FIG. 9, at the opposite end to the one connected to the hinge 34, each portion 33 is connected to the vertex 22 of a respective tetrahedron 8 by a swivel 39 comprising (FIG. 9) an arm 40, which is swivellingly mounted with respect to the central hub hinge 23 around an axis 39a parallel to the internal side 9a of the respective tetrahedron and has two end portions 41, each of which is connected to the axial end of a respective crowning linkage 32 by means of a one-degree-of-freedom hinge to enable the crowning linkage 32 to oscillate around an axis 42 parallel to axis 36.

As shown in FIG. 8a, the length of each crowning linkage 32 is greater than the distance between the vertices 22 of two adjacent tetrahedrons 8; this geometric characteristic ensures that once the tetrahedrons 8 have completed their deployment under the thrust of the flat springs 17 placed between the pair of elements 13 of the bars 12 and the reference axes 29 of the tetrahedrons 8 are still parallel to each other, the portions 33 of each crowning linkage 32 are still not coaxial with each other. At this point, the further thrust provided by the flat springs 37 to complete the compass-like opening of portions 33 until they are completely aligned entails the rigid rotation of all the tetrahedrons 8, with respect to the crowning linkages 32, around the respective internal sides 9a and the axes 9a of the respective swivels 39.

Figure 1B:
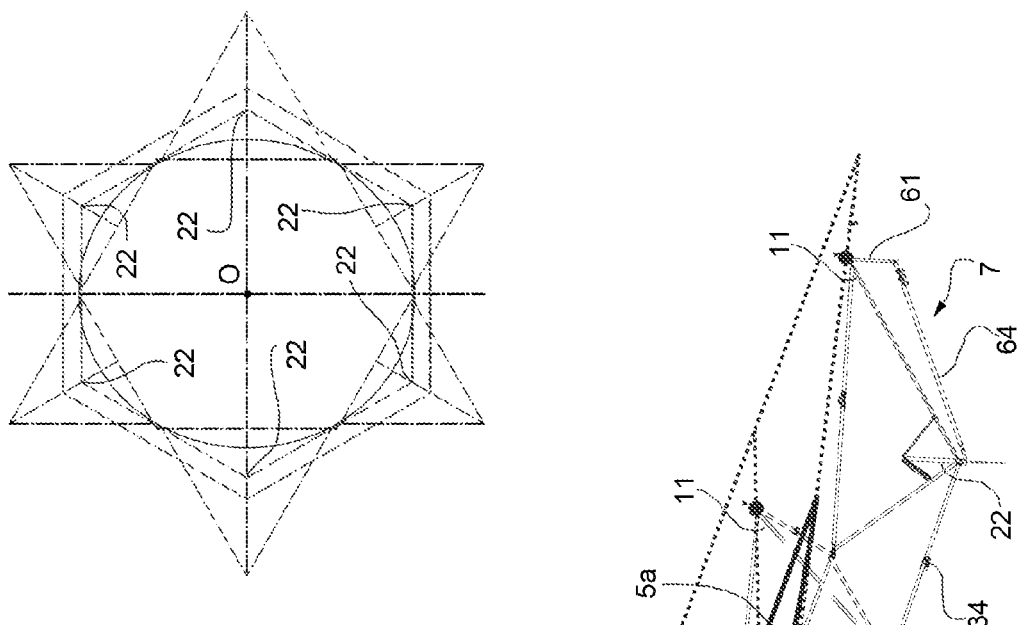
FIG. 1b schematically shows a face view of a detail of FIG. 1 in two different functional configurations.
Figure 1A:
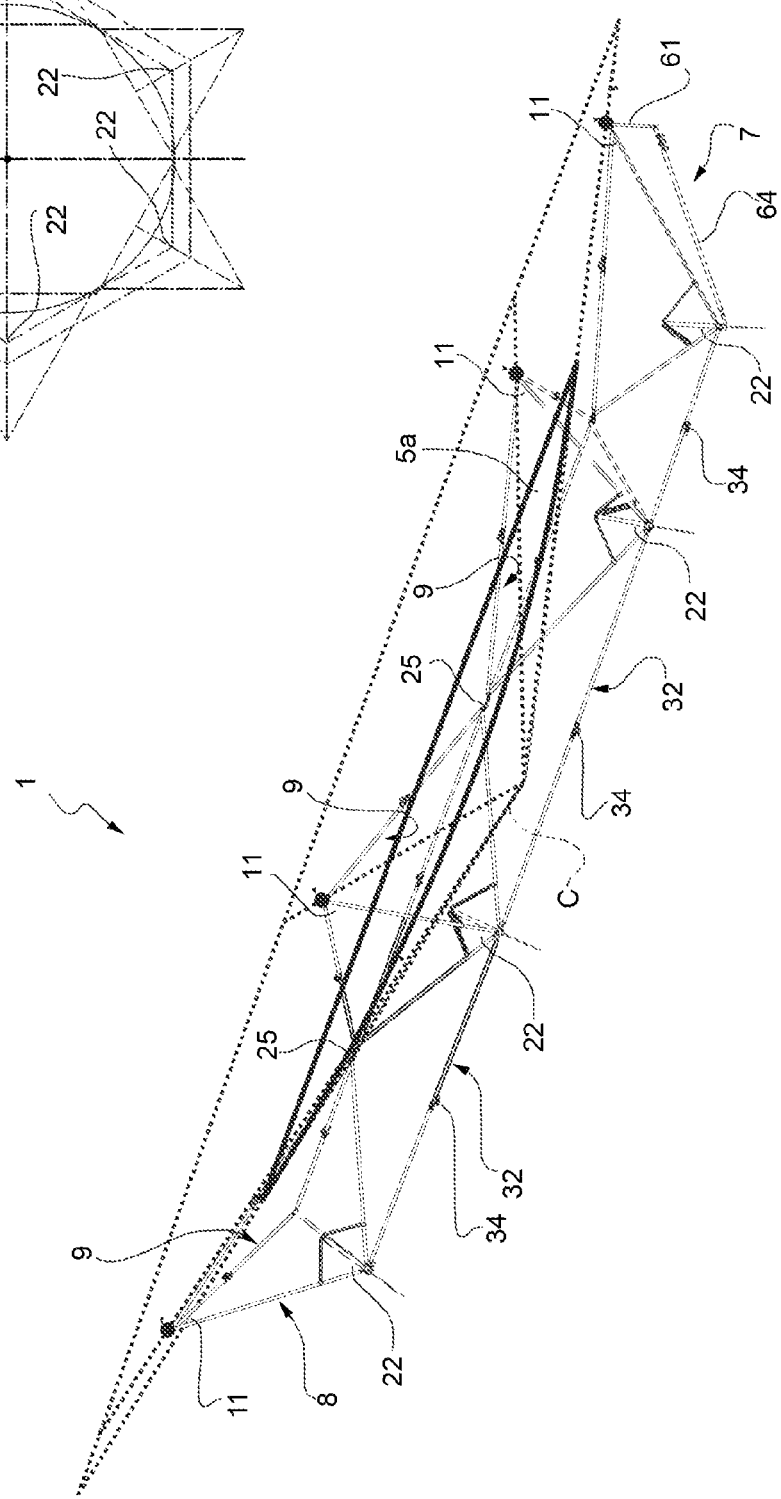
FIG. 1a is a side view, with parts removed for clarity, of FIG. 1.

With regard to this, and with reference to FIG. 1b, it is important to note that the above-mentioned rotation of the tetrahedrons 8 is such that the vertices 22 of the tetrahedrons 8 move towards the outside by a same distance; in other words, if the vertices 22 are connected together by a line, the so-obtained polygon has, in the final rotated configuration of the tetrahedrons 8, a constant offset with respect to the initial conditions.

Figure 11A:
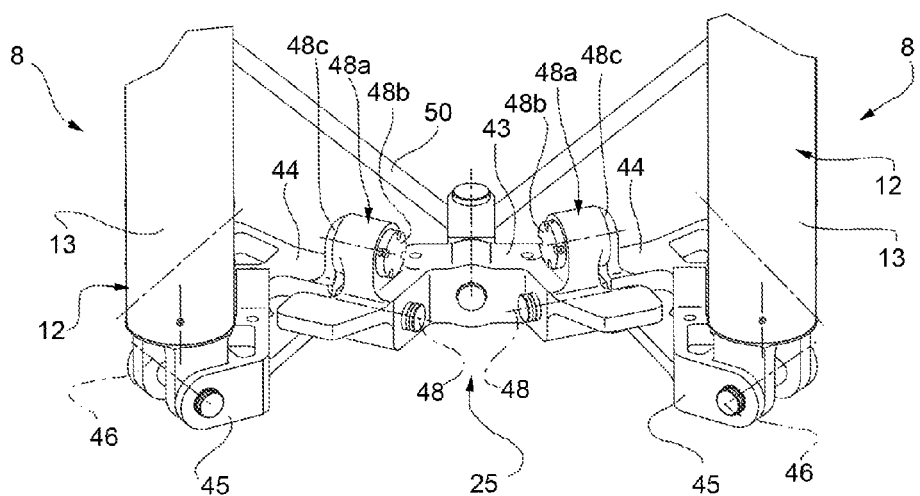
FIGS. 11a and 11b show, on an enlarged scale, a detail of FIG. 8 in respective operating configurations.
Figure 11B:
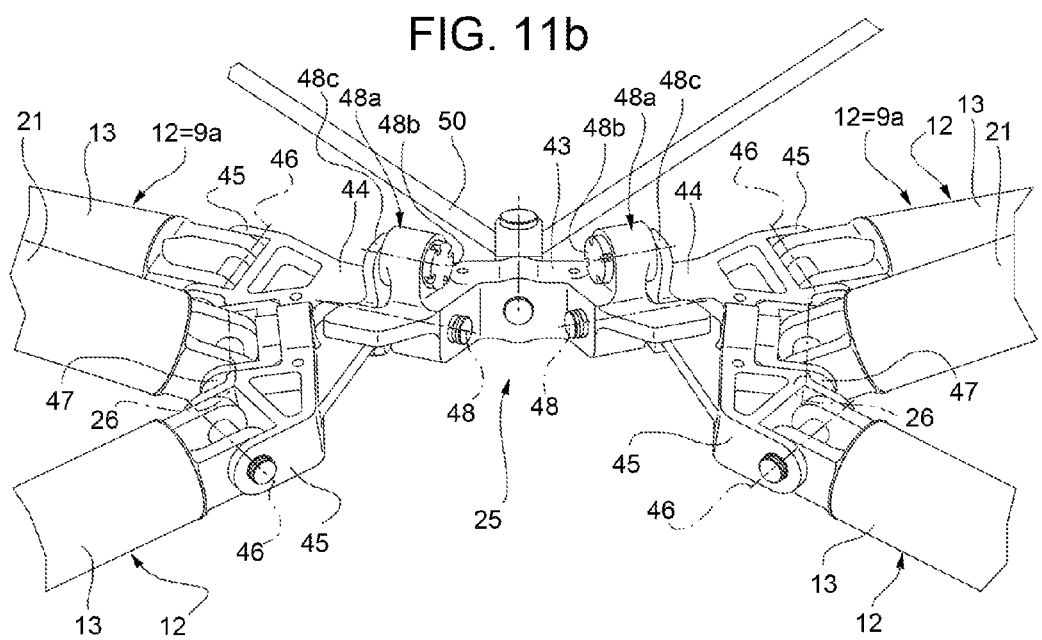

This rotation is made possible by the triple joints 25, each of which connects two adjacent tetrahedrons 8 together and by swivel 39, which enables rotation of the tetrahedrons 8 with respect to the crowning linkages 32. As shown in FIGS. 11a and 11b, for each triple joint 25, and for each of the two tetrahedrons 8 connected to it, a pair of bars 12 and a rib 21 converge on and are hinged to the joint 25 for rotating one with respect to the other and with respect to the triple joint 25, from the closed position of the respective tetrahedron 8, in which the bars 12 and the rib 21 are parallel to each other, to the open position of the respective tetrahedron 8, in which the bars 12 and the rib 21 form corresponding corners of the respective tetrahedron 8.

Figure 16C:
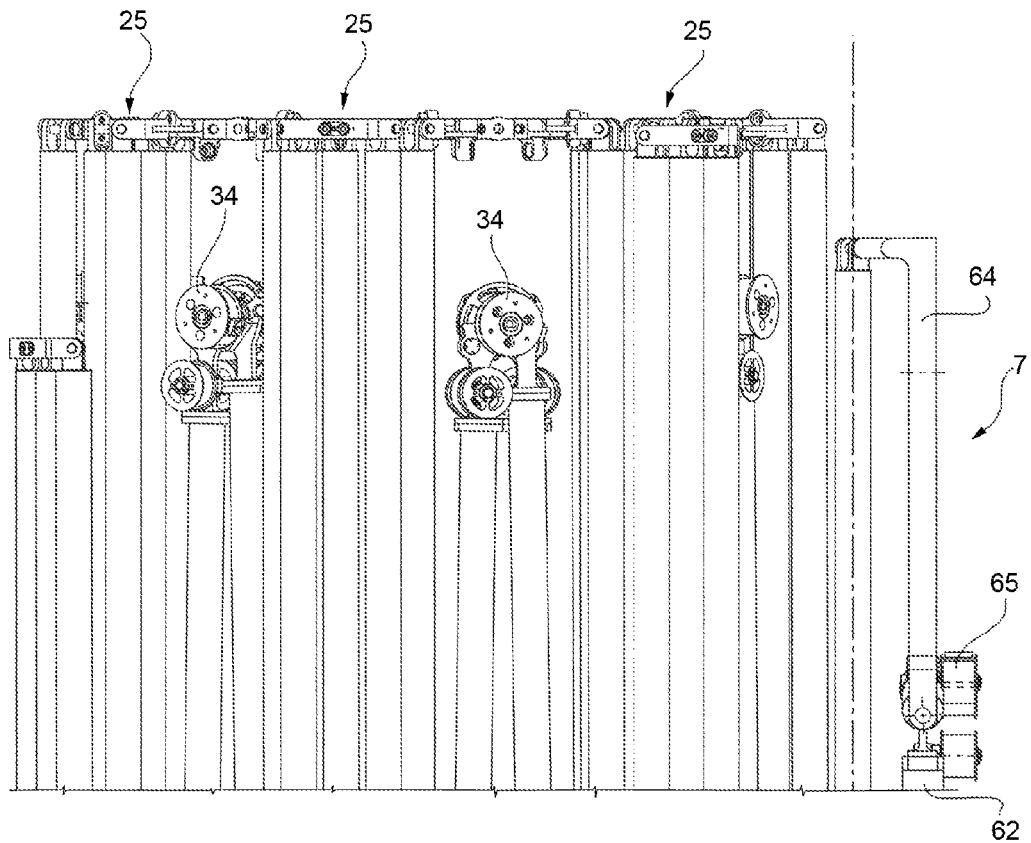

In particular, the triple joint 25 comprises a central body having the shape of a fork 43 and two side plates 44, which are arranged symmetrically on opposite sides of the fork 43, lying on the same plane as the fork 43 when the tetrahedrons 8 are in the stowed configuration, and each having three appendages, to which the bars 12 and the rib 21 are hinged. In particular, the three appendages comprise two end appendages, each of which defines a respective hinge 45 able to allow rotation of a bar 12 around a respective axis 46 perpendicular to the bar 12, and an intermediate appendage defining a hinge 47 able to allow rotation of the rib 21 around the respective above-mentioned axis 26. Axes 46 and axis 26 are coplanar and define, when the tetrahedron 8 is completely deployed, the plane on which the related base 9 lies. Each of the plates 44 of a triple joint 25 is, in turn, hinged to a respective arm of the fork 43 to oscillate around a respective axis 48, which is coplanar and inclined with respect to the other axis 48 of the same triple joint 25 and is coplanar with the axes 48 of the other triple joints 25. The oscillation around axis 48 enables the related plate 44 to move from an initial position (FIG. 11a), which is maintained by the plate 44 until the tetrahedron 8 is completely deployed, starting from the stowed configuration in which the plate 44 is coplanar with the fork 43, and a final position (FIG. 11b), which is assumed when the tetrahedron 8 rotates around its internal side 9a under the effect of the crowning linkages 32 opening and in which the plate 44 is rotated by a certain angle with respect to the fork 43 and each axis 48 is coaxial with the internal side 9a of the respective tetrahedron 8 that is connected to it. In other terms, the triple joints 25 are configured in such a way that, in use, when the tetrahedrons 8 are folded up, the plane defined by the axes 46 of the bars 12 and axis 26 of the rib 21 in each plate 44 are coplanar with the plane defined by the axes 48 of the same triple joint 25 and all the other triple joints 25 (please see FIG. 16c); that, when the tetrahedrons 8 have reached the fully open position, the plane defined by axes 46 and by axis 26 of each plate 44 are still coplanar with the plane defined by the axes 48 of the same joint 25 and of all the other triple joints 25 in such a way that the support structure 6 assumes a transitory intermediate configuration (not shown) between the stowed and deployed configurations and in which the reference axes 29 of the tetrahedrons 8 are parallel to each other; and, finally, that, when the crowning linkages 32 extend completely and impart a rotational movement to the tetrahedrons 8 around the respective internal sides 9a, plates 44 rotate around the respective axes 48 (FIG. 11b) and the bases 9 become inclined with respect to one another in such a way that the external vertices 11 of the bases 9 become ideally positioned on the cone tangent to the parabolic reflector 5.

Finally, as shown in FIGS. 11a and 11b, the triple joint 25 comprises an angular locking device 48a for each plate 44 with the purpose of preventing the respective plate 44 from oscillating around axis 48 after it has reached the above-mentioned final position. The angular locking device 48a is conceptually similar to locking devices 20a and comprises, in particular, a pin 48b, having its axis parallel to axis 48 and installed, with the interposition of a spring, on an appendage of the fork 43, so that it projects towards a plate 48c carried by plate 44 and provided with a pass-through hole. When plate 44 rotates with respect to the fork 43, the hole made on plate 48c is made to rotate around axis 48 until it aligns with the pin 20b and is snap-engaged by the latter.

Figure 12:
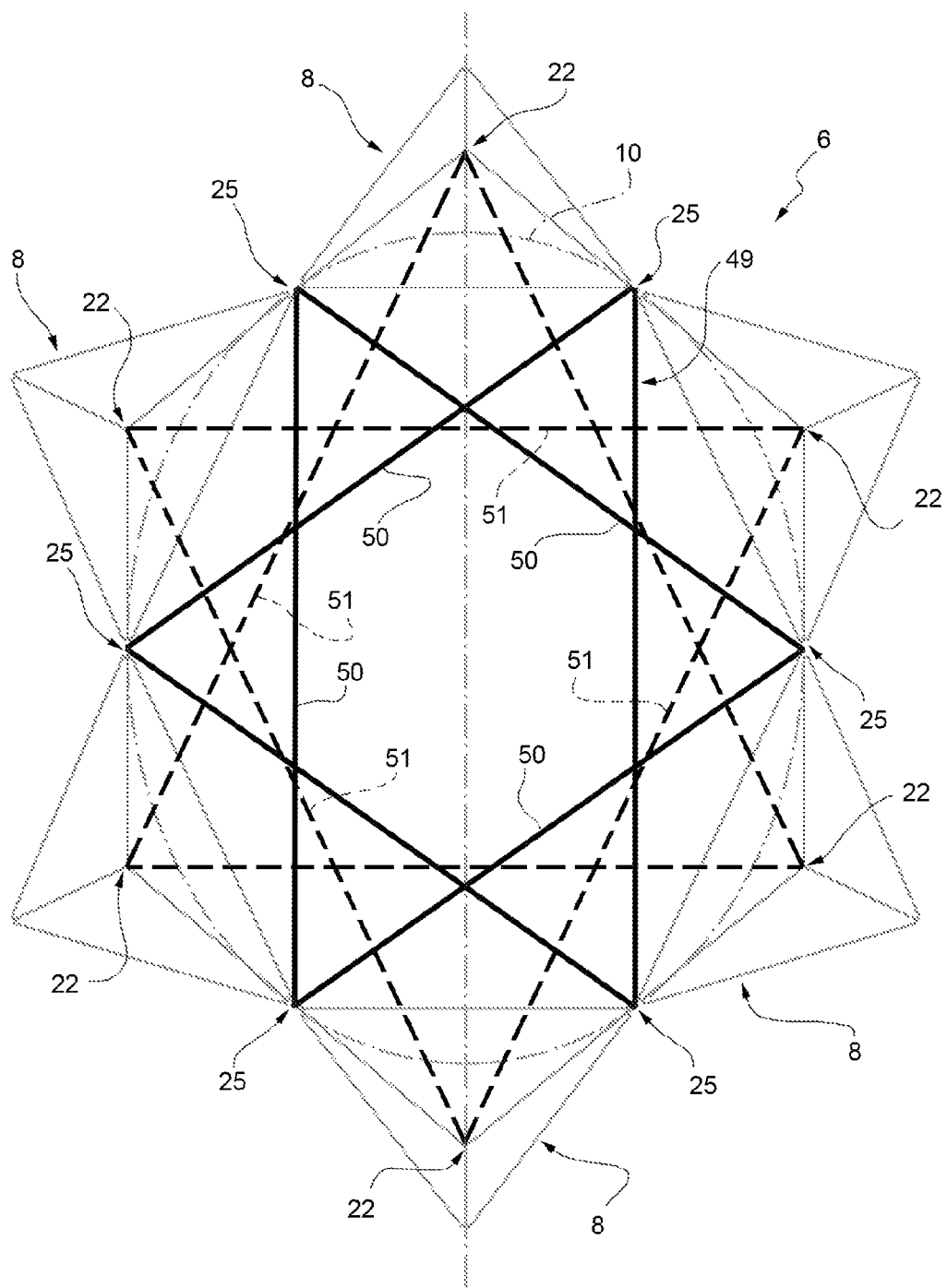
FIG. 12 is a plan view of FIG. 2.
Figure 13:
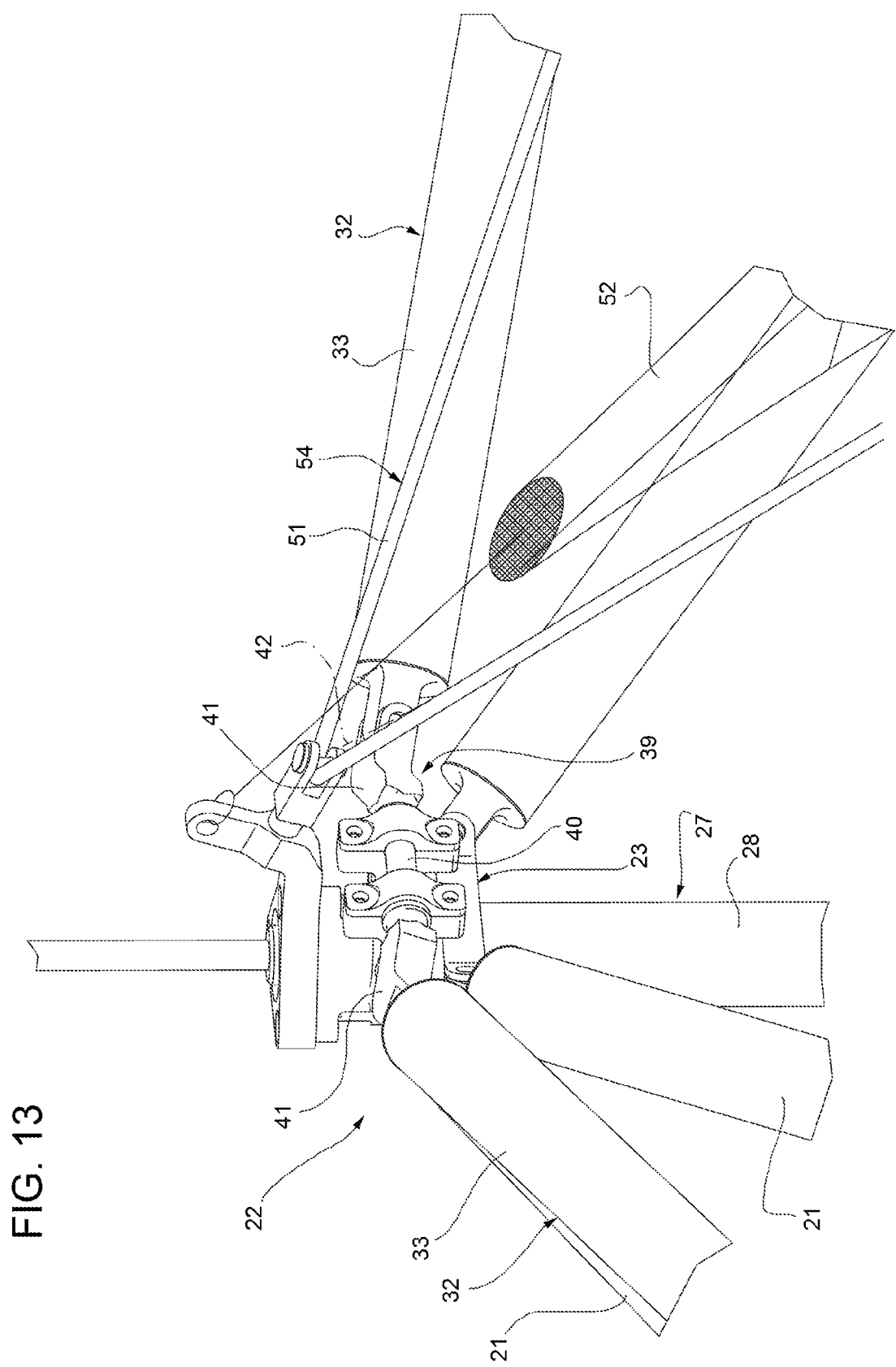
FIG. 13 shows a perspective view, on an enlarged scale, of a detail of the reflector in FIG. 1.

FIG. 12 shows a tensioning system 49 for the support structure 6 that uses cables. In particular, the tensioning system 49 comprises two sets of cables, comprising a set of front cables 50 (shown with unbroken lines in FIG. 12), which are anchored to the forks 43 of the triple joints 25 (FIGS. 11a and 11b), and a set of rear tensioning cables 51 (shown with broken lines in FIG. 12), which are anchored to the vertices 22 of the tetrahedrons 8. In particular, as shown in FIG. 13, the rear cables 51 are anchored to the vertex 22 by means of a bracket rigidly installed on the respective central hub hinge 23 and arranged at the upper end of the cylinder 28 of the damper 27. In use, the cables 50 and 51 are tensioned by the support structure 6 the moment that the latter completes the deployment phase under the thrust of the compass-like opening of the bars 12 and the crowning linkages 32. Regarding what has been mentioned above, it is opportune to specify that the support structure 6 is configured in a way such that, once the completely deployed configuration is achieved, its geometry is uniquely determined without the need for tensioning cables 50 and 51. However, since the elements that form the support structure 6, namely the bars 12, the ribs 21 and the crowning linkages 32, are, preferably, tubular elements having a certain flexibility, use of the tensioning cable system 49 enables achieving greater stiffness due to the well-known principles of tensegrity structures, according to which the interaction between compressive components (in this case, the tubular elements of the support structure 6) and tensional components (in this case, the cables 50 and 51), gives the structure greater strength and resistance that the sum of its components.

Figure 14:
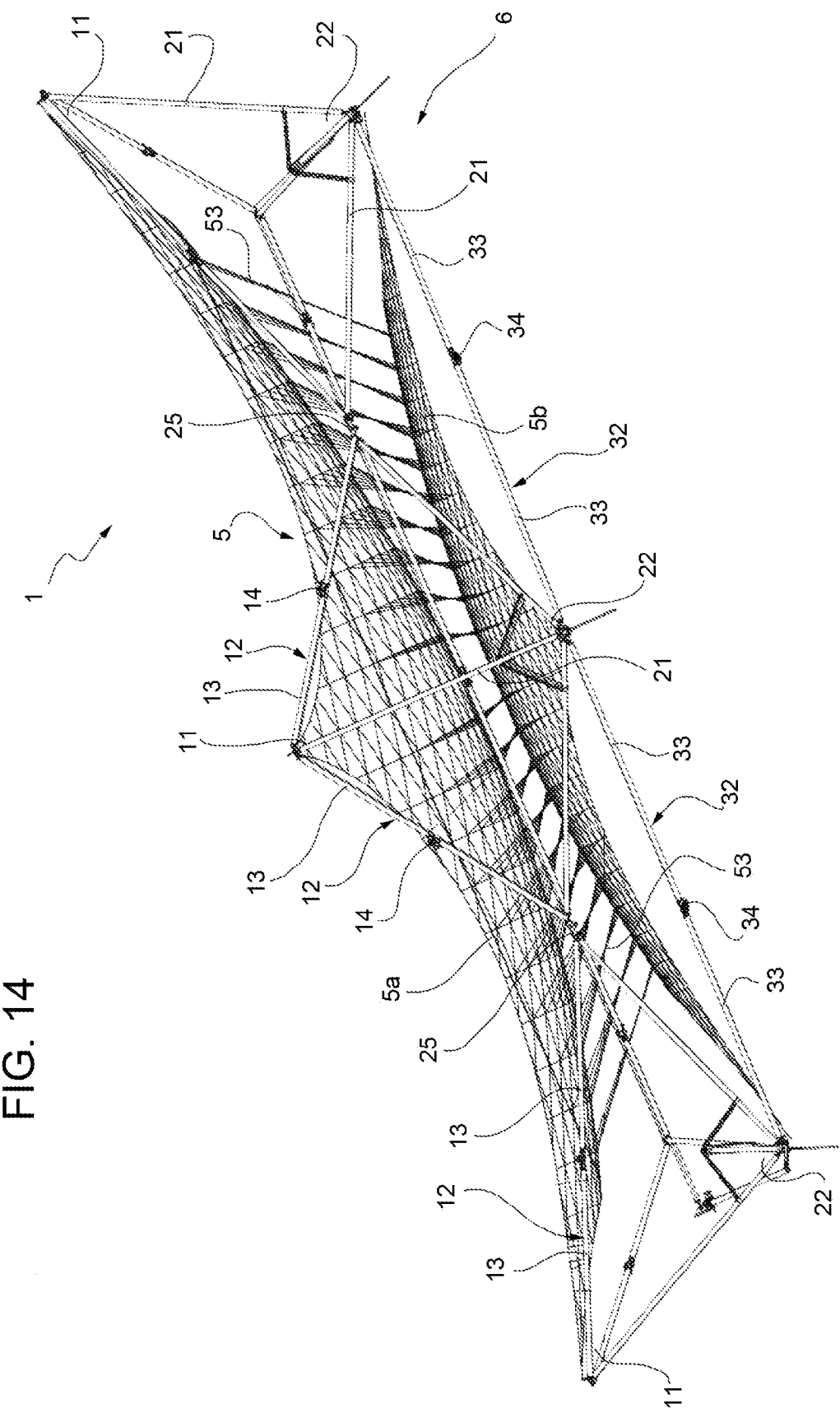
FIG. 14 shows, in lateral elevation and with parts removed for clarity, the reflector in FIG. 1.

FIG. 14 shows the reflector assembly 5 in detail and in lateral elevation, this being made of a pliable material so that it can be folded inside the support structure 6, when the latter is in the stowed configuration, and extend in orbit as a consequence of the deployment of the support structure 6. In particular, the reflector assembly 5 comprises the parabolic mirror 5a, which extends in front of the bases 9 and is anchored to the support structure 6 at the external vertices of the bases 9, is made of an electrically conductive fabric material and constitutes the "active" or reflective part of the reflector assembly 5, and a contrasting mesh/net 52, which is opposite to and symmetrical with respect to the parabolic mirror 5a and is anchored to the support structure 6 at the vertices 22 (FIG. 14). The mesh/net 52 has the function of providing the parabolic shape to the parabolic mirror 5a and, for this purpose, is connected to the parabolic mirror 5a by a plurality of tensioned cables 53 having progressively increasing lengths from the centre to the outside of the reflector assembly 5.

Figure 15:
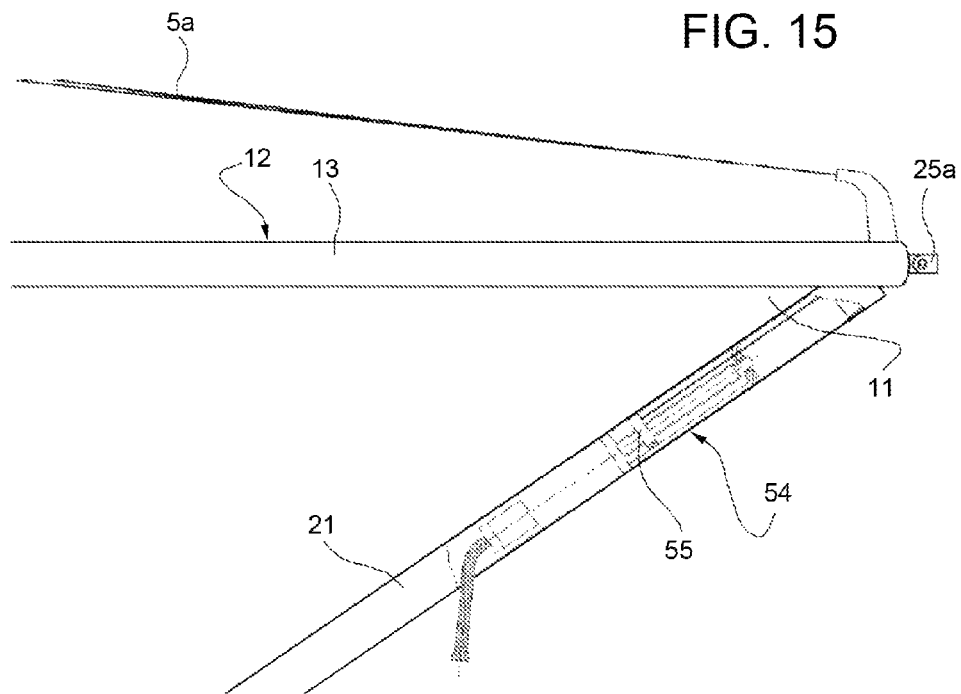
FIG. 15 shows, on an enlarged scale, a detail of FIG. 1.

In use, the parabolic mirror 5a and the mesh/net 52 extend following, and as a result of, the deployment of the support structure 6. However, their tensioning does not take place passively as a direct consequence of the support structure 6 reaching the deployed configuration, but is actively performed only after the support structure 6 has assumed its rigid stable condition, wherein the cables 50 and 51 are tensioned by means of a tensioning device 54 (FIG. 15), which acts on the parabolic mirror 5a and comprises a plurality of actuators 55 inserted inside a respective rib 21 close to the respective external vertices 11 and able to apply an outwardly directed tensioning force to the periphery of the parabolic mirror 5a capable of tensioning the parabolic mirror 5a. The use of the tensioning device 54 enables decoupling the mechanical system constituted by the reflector assembly 5 from the mechanical system constituted by the support structure 6, i.e. to make the shape of the reflector assembly 5 independent of reaching the final structure of the support structure 6. The greater the ratio between the stiffness of the support structure 6 with respect to the stiffness of the mesh/net 52, the greater will be the decoupling of the two systems. The number of actuators 55 can vary from a minimum of three actuators, uniformly spaced out along the periphery of the support structure 6, to a maximum equal to the number of external vertices 11.

In FIG. 16, the support structure 6 is showed in the stowed configuration used during the launching of the satellite 2 and until the required orbit is reached. For this purpose, the reflector 1 comprises a retaining device 56 with the function of keeping the support structure 6 in the stowed configuration and, once in orbit, leaving the support structure 6 free to deploy itself under the thrust of the flat springs 17 and 37 placed respectively on the bars 12 and on the crowning linkages 32. As shown in FIG. 17, the retaining device 56 comprises a tie 57 passing through the eyelets 58, each of which is integral with a rib 21 of a respective tetrahedron 8 and extends from the rib 21 towards the centre of the cylinder formed by the set of folded tetrahedrons 8. The retaining device 56 is further provided, along the tie 57, with a separator device 59, for example a knife, which can be operated from the outside by remote control to cut the tie 57 at the opportune moment, and a reel 60 equipped with elastic return means for the tie 57 when it has been cut. The position of the tie 57 with respect to the height of the tetrahedrons 8 is such as to reduce to a minimum the tension inside the hinges 14 and 34 due to the thrust of the respective flat springs 17 and 37.

Figure 16A:
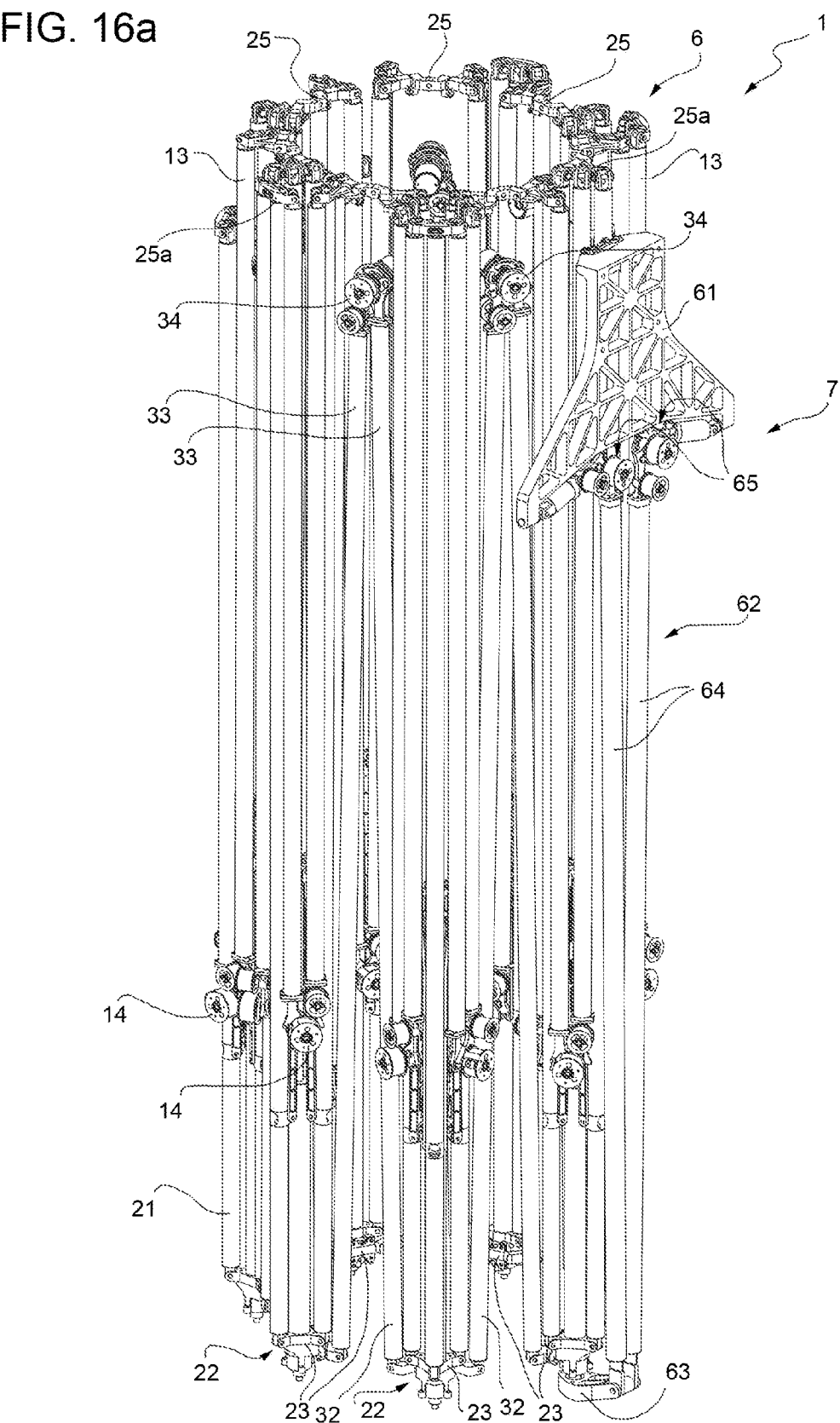
FIG. 16a shows the reflector in FIG. 1 in a stowed configuration.
Figure 16B:
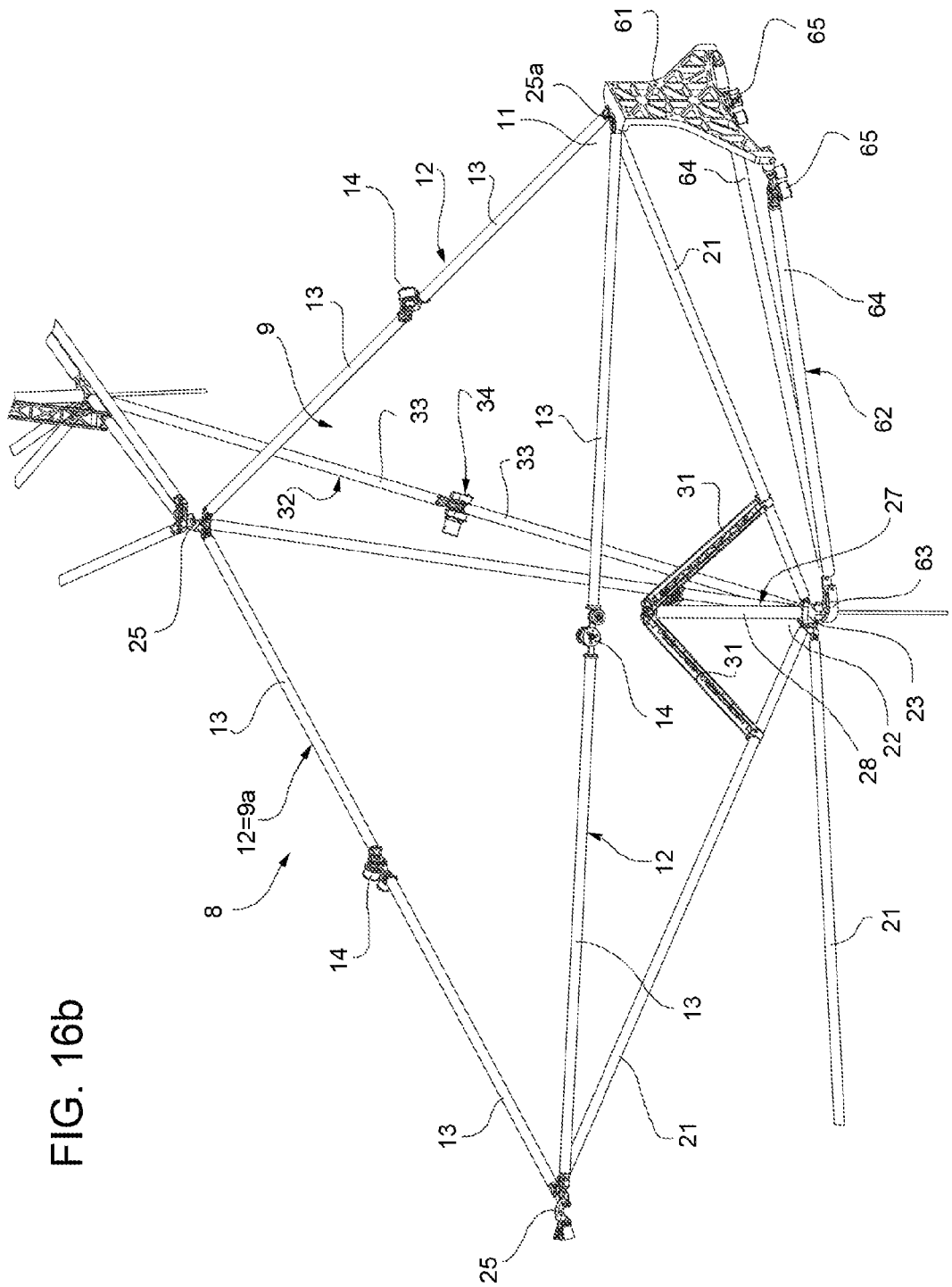
FIG. 16b shows a detail of FIG. 16a in a different operating configuration.
Figure 17:
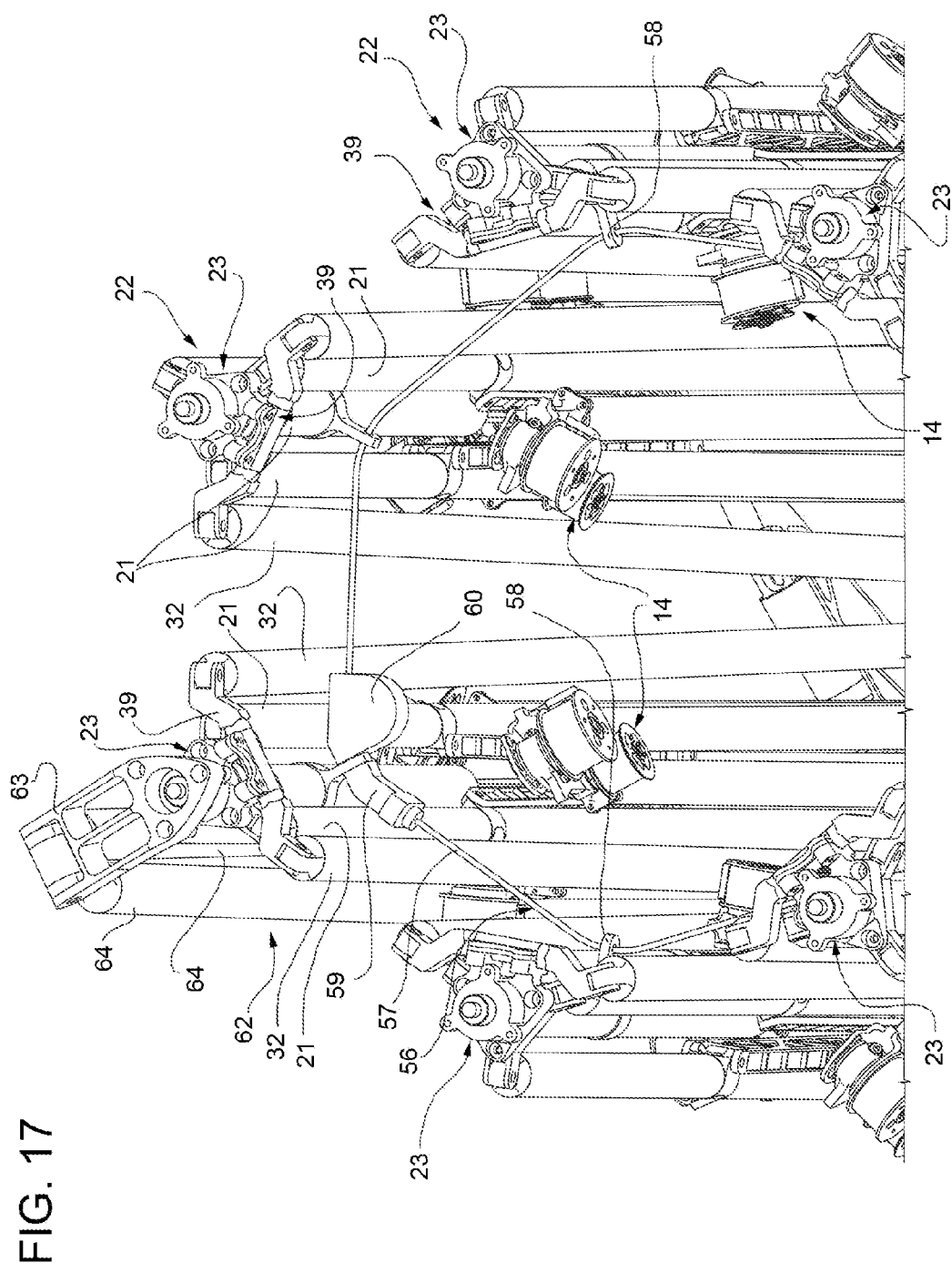
FIG. 17 shows a perspective view, on an enlarged scale, of a detail of FIG. 16.

As shown in FIGS. 16a and 16b, the reflector 1 is joined to the satellite 2 by the above-mentioned connecting device 7, which comprises a plate 61 that is connected on one side to the satellite 2 by means of known actuator devices that not shown and, on the other side, to a joint 25a at an external vertex 11, and a deployable arm 62 that is hinged on one side to plate 61 and on the other to a bracket 63 connected to one of the vertices 22 and projecting transversally towards the outside of the cylinder formed by the set of folded tetrahedrons 8. In particular, the deployable arm 62 comprises two linkages 64, each of which comprises, in turn, two portions arranged at right angles, of which a first portion is hinged directly to plate 61 and extends transversally to the cylinder formed by the folded tetrahedrons 8 and a second portion that is substantially parallel to the bars 12 and the ribs 21 of the folded tetrahedrons 8, extending from the first portion to the bracket 63 and is hinged to the same first portion by a respective flat spring hinge 65, similar to hinges 14, to rotate around a respective axis perpendicular to plate 61.

The operation of the reflector 1 clearly derives from that described above and does not require further explanation.

Instead, with regard to the foregoing description, it is opportune to make some observations concerning the characteristics and advantages of the reflector 1 of the present invention.

First of all, the reflector 1 is a modular reflector and scalable in the sense that its dimensions can be varied according to needs without making substantial changes to the base structure.

With regard to modularity, this property is applicable to a reflector 1 of the above-described type in the case where it is hexagonal, i.e. composed of six tetrahedrons 8. In this case, the reflector 1 can be considered a module 'm' that when combined with other identical modules 'm' forms a reflector 1 composed of n modules 'm' able to provide a reflector assembly 5 with a diameter much larger than a single module.

The FIGS. 18a and 18b show two examples of modular reflectors 1 that can be achieved by joining four and seven modules 'm', respectively. Since the cross-section of a module arranged in the stowed configuration has a relatively small size, this modular approach enables producing antennas with a very large aperture, even greater than 18 meters, whilst still keeping the cross-section of the cylinder defined by the folded reflector 1 within relatively small values, generally of the order of 1.5 meters.

With regard to scalability, this property derives from the fact that the reflector 1 is structured in a way such that its size can be varied by modifying the length of the linear elements forming the support structure 6, such as the bars 12, ribs 21 and crowning linkages 32, without having to make changes in terms of number, arrangement and functionality of the components used for deployment of the reflector 1. For example, a reflector 1 having an aperture diameter for the parabolic mirror 5a of approximately 5 meters can be scaled, in the above-described manner, up to a diameter of approximately 16 meters.

From the theoretical standpoint, no limit exists to the scalability of the support structure 6, and therefore of the reflector 1, in terms of increase in size. However, from the practical viewpoint, a limit is imposed by the payload requirements for the reflector 1 on a typical launcher for the satellite 2. In fact, if, on one hand, the increase in length of the elements of the support structure 6 does not substantially increase the cross-section of the cylinder defined by the support structure 6 arranged in the stowed configuration, on the other, the length of this cylinder increases proportionally with the length of the linear components of the support structure 6; therefore, the maximum length of these components is limited by the maximum bulk allowed for stowing the reflector 1 on the launcher of the satellite 2.

Figure 19:
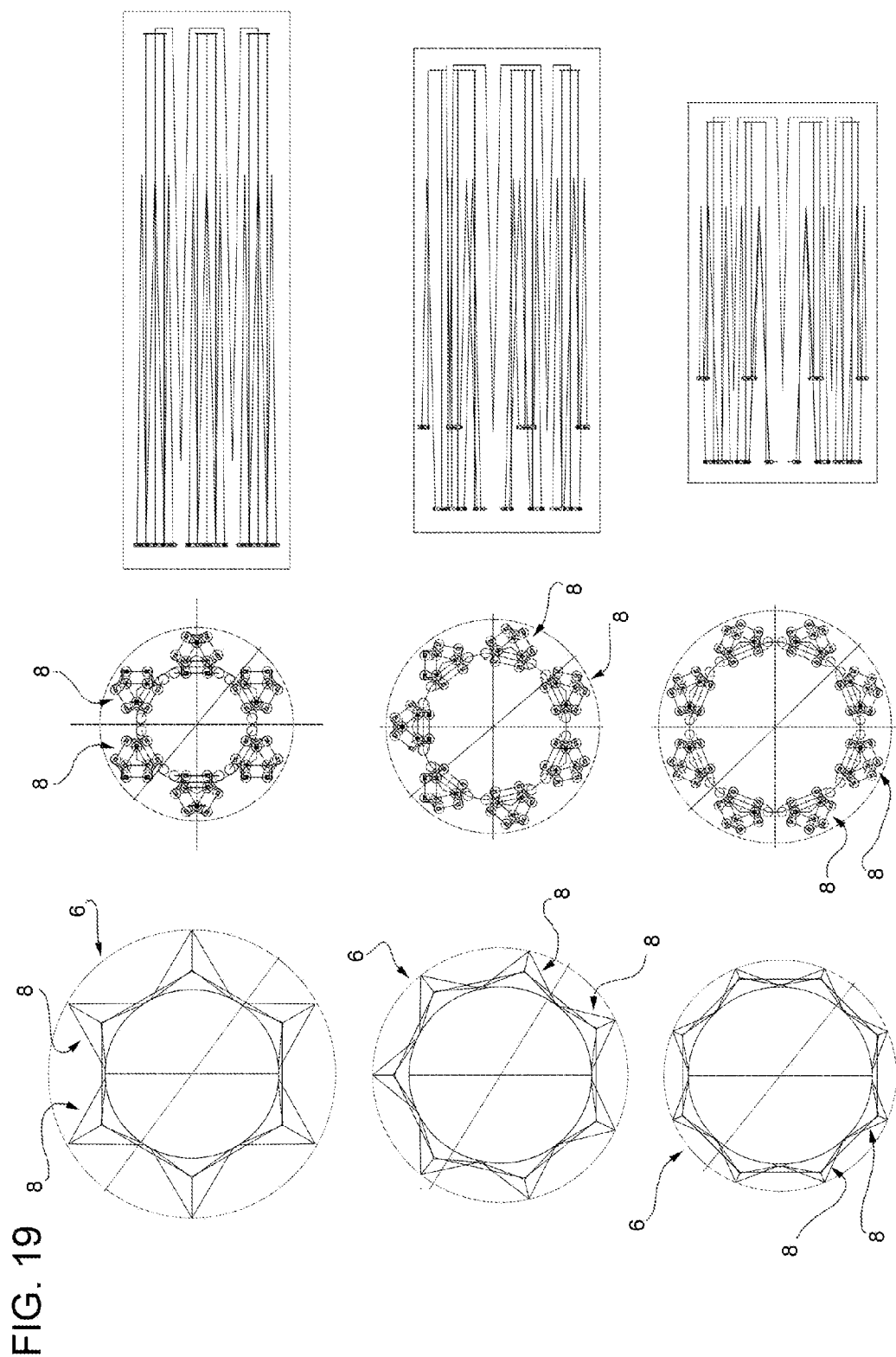
FIG. 19 schematically shows the size ratios between the embodiments in FIG. 3.

Apart from scalability and modularity, the reflector 1 has a further characteristic of flexibility, deriving from the possibility of changing the number of tetrahedrons 8 of which it is composed to obtain different overall dimensions while still maintaining the same aperture diameter for the parabolic mirror 5a. In particular, as shown in FIG. 19, it can be stated that an increase in the number of tetrahedrons 8 results in an increase in the diameter of the cross-section of the cylinder defined by the support structure 6 in the stowed configuration and, at the same time, a decrease in the length of this cylinder and the maximum diameter of the support structure 6 arranged in the deployed configuration.

A further advantage of the reflector 1 lies in the fact that it is possible to predict and control the entire deployment sequence of the reflector 1 from its stowed configuration to its final deployed configuration in a very precise manner. This result is achieved thanks to the possibility of accurately predicting the kinematics of the structure by virtue of an accurate distribution of the degrees of freedom of the system, which does not make use of flexible elements, ball joints and elements that are non-linear or have a high internal friction coefficient, but almost exclusively hinges and joints that allow the elements connected to them only one degree of freedom. For example, each tetrahedron 8 constitutes a one-degree-of-freedom system, the deployment of which takes place in a controlled manner thanks to the presence of the hinges 14 positioned between the elements 13 of the bars 12 and in a synchronized manner thanks to the presence of the damper 27.

The invention claimed is:

1. A large deployable reflector for a satellite antenna; the reflector (1) comprising a support structure (6) provided with connection means (7) for mounting the support structure (6) on a satellite (2) and a reflector assembly (5) carried by the support structure (6) and comprising a reflective parabolic mirror (5a); the support structure (6) being a jointed reticulate structure comprising building blocks (8) and being able to assume a compact inoperative stowed configuration and an operative deployed configuration; the reflector (1) being characterized in that said building blocks (8) are tetrahedron-shaped elements (8), connected to each other to form a ring-like structure; the tetrahedrons (8) have respective triangular bases (9), which are connected to each other at the axial ends of respective first sides (9a) and have respective external vertices (11), which are opposite to said respective first sides (9a) and, when the reflector (1) is arranged in the deployed configuration, ideally lie on an elliptical cone tangent to the parabolic mirror (5a).

2. A reflector (1) according to claim 1, wherein the bases (9) delimit between them a polygon inscribed in an ellipse (10), which corresponds to the aperture plane of the parabolic mirror (5a); the tetrahedrons (8) being arranged around the ellipse (10) in a symmetrical manner with respect to an optical plane (Xo-Zo) of the parabolic mirror (5a).

3. A reflector (1) according to claim 1, wherein each tetrahedron (8) is an articulated element movable between a closed configuration and an open configuration and having a vertex (22) opposite to the respective base (9) and an axis (29) passing through the vertex (22); the support structure (6) comprising first joints (25), which connect the bases (9) to one another to enable the respective tetrahedrons (8) to rotate around respective first sides (9a); the support structure (6) being configured to pass from the stowed configuration to an intermediate configuration, between the stowed and deployed configurations; in this intermediate configuration the tetrahedrons (8) assuming the respective open configurations without having performed rotations around the respective first sides (9a); the support structure (6) being further configured to pass from the intermediate configuration to the deployed configuration following the rigid rotation of the tetrahedrons (8) around the respective first sides (9a).

4. A reflector (1) according to claim 3, wherein the support structure (6) comprises elastic means (14, 17) to move each tetrahedron (8) from the closed configuration to the open configuration.

5. A reflector (1) according to claim 4, wherein each base (9) is composed of three bars (12) connected to each other in an articulated manner and of which one defines said first side (9a); each bar (12) comprising two elements (13) hinged to each other to define a compass system with one degree of freedom.

6. A reflector (1) according to claim 5, wherein said two elements (13) of each bar (12) are connected to each other by a first constant-torque flat spring hinge (14) including said elastic means (17).

7. A reflector (1) according to claim 3, wherein each tetrahedron (8) comprises three ribs (21) hinged to the vertex (22) of the tetrahedron (8) and extending from the vertex (22) to the base (9) to define respective edges of the tetrahedron (8); each tetrahedron (8) being equipped with a respective damper device (27) arranged at the vertex (22)

and connected to the ribs (21) to control the deployment speed of the tetrahedron (8) from the closed configuration to the open configuration.

8. A reflector (1) according to claim 3, wherein the support structure (6) comprises a crown of linkages (32), each of which connects together the vertices (22) of two adjacent tetrahedrons (8), comprises two portions (33) hinged to each other to define a compass system with one degree of freedom, and is movable between an inoperative position, in which the portions (33) are parallel to each other and the tetrahedron (8) is in the closed configuration, and an operative position, in which the portions (33) are aligned with each other and the tetrahedron (8) is in the open configuration.

9. A reflector (1) according to claim 8, wherein the portions (33) of each crowning linkage (32) are connected the each other by a constant-torque dampened hinge (34) able to cause the two portions (33) to rotate around an axis (36) perpendicular to the in which the portions (33) to move the respective crowning linkage (32) from the inoperative position to the operative position.

10. A reflector according to claim 8, wherein the length of each crowning linkage (32) is greater than the linear distance between the two vertices (22) that it connects; The movement of each crowning linkage (32) from the inoperative position to the operative position being such as to cause, when the tetrahedrons (8) are arranged in their open configuration, the rotation of the tetrahedrons (8) around said first sides (9a) of the respective bases (9) and cause the support structure (6) to assume the deployed configuration.

11. A reflector according to claim 1, further comprising a tensioning device (49) for the reflector assembly (5); said tensioning device (49) being operable to tension the reflector assembly (5) only after the support structure (6) has reached the operative deployed configuration.

12. A reflector according to claim 1, further comprising a plurality of said support structures (6) connected to each other to form a modular support structure (6).

* * * * *